(12) United States Patent
Balasubramanian

(10) Patent No.: US 11,294,690 B2
(45) Date of Patent: Apr. 5, 2022

(54) PREDICATED LOOPING ON MULTI-PROCESSORS FOR SINGLE PROGRAM MULTIPLE DATA (SPMD) PROGRAMS

(71) Applicant: Infineon Technologies AG, Neubiberg (DE)

(72) Inventor: Prakash Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 80 days.

(21) Appl. No.: 16/775,621

(22) Filed: Jan. 29, 2020

(65) Prior Publication Data
US 2021/0232401 A1 Jul. 29, 2021

(51) Int. Cl.
| G06F 9/38 | (2018.01) |
| G06F 9/32 | (2018.01) |
| G06F 9/48 | (2006.01) |
| G06F 9/30 | (2018.01) |
| G06F 9/50 | (2006.01) |

(52) U.S. Cl.
CPC ............ *G06F 9/3889* (2013.01); *G06F 9/325* (2013.01); *G06F 9/3009* (2013.01); *G06F 9/30098* (2013.01); *G06F 9/30189* (2013.01); *G06F 9/4843* (2013.01); *G06F 9/5033* (2013.01)

(58) Field of Classification Search
CPC .... G06F 9/3889; G06F 9/3887; G06F 9/3885; G06F 9/325; G06F 9/5033
See application file for complete search history.

(56) References Cited

U.S. PATENT DOCUMENTS

| 6,269,440 B1 * | 7/2001 | Fernando | G06F 8/452 712/241 |
| 2004/0193858 A1 * | 9/2004 | Ahmad | G06F 9/325 712/241 |
| 2006/0107028 A1 * | 5/2006 | Meuwissen | G06F 9/30181 712/241 |
| 2009/0125907 A1 * | 5/2009 | Wen | G06F 9/4843 718/101 |
| 2013/0125105 A1 * | 5/2013 | Gao | G06F 8/51 717/160 |

(Continued)

OTHER PUBLICATIONS

Nikolaos Kavvadias and Spiridon Nikolaidis, "Elimination of Overhead Operations in Complex Loop Structures for Embedded Microprocessors", February, IEEE, pp. 200-213 (Year: 2008).*

(Continued)

*Primary Examiner* — Courtney P Carmichael-Moody
(74) *Attorney, Agent, or Firm* — Eschweiler & Potashnik, LLC

(57) ABSTRACT

Single Program, Multiple Data (SPMD) parallel processing of SPMD instructions can be generated among processors assigned to a task in a plurality of threads. The SPMD parallel processing can be increased in speed by performing predicated looping with the SPMD instructions in an activated SPMD mode of operation over a non-SPMD mode. Execution of overhead instructions is removed from the SPMD instructions associated with a thread in order to only execute the loop body of a loop associated with a data element of a data set in an enhanced Zero Loop Overhead (ZOL) device.

16 Claims, 17 Drawing Sheets

(56) References Cited

U.S. PATENT DOCUMENTS

2014/0033203 A1\* 1/2014 Dogon ................ G06F 9/30029
  718/100
2017/0344375 A1\* 11/2017 Zhu ..................... G06F 9/30065

OTHER PUBLICATIONS

Andrew Tanenbaum, "Structure Computer Organization", Prentice Hall, Second, p. 11 (Year: 1984).\*

Uh GR., Wang Y., Whalley D., Jinturkar S., Burns C., Cao V., "Techniques for Effectively Exploiting a Zero Overhead Loop Buffer", Springer-Verlag Berlin Heidelberg, pp. 157-172 (Year: 2000).\*

\* cited by examiner

| High level language Code | Corresponding Assembly language Code |
| --- | --- |
| Spmd_on(BLOCK-SIZE, MYTHREAD, THREADS); | Spmd-enter #MYTHREAD, #BLOCK-SIZE, #THREADS |
| | Push R5 => R5 is the shadow register |
| for(i=0; i<N; i++) | |
| { | Loop N,0x18 |
| Body of the loop | Instruction-1 of body |
| | Instruction-2 of body |
| | . |
| | . |
| | Instruction-7 of body |
| } | Pop R5 |
| Spmd_off(); | Spmd-exit |

R5 is used as loop iterator

- 1000 Start address of Add program in memory
- 1004 Some assembly instruction pertaining to initialization of Add program
- 1008 Perhaps another initialization related assembly instruction
- 1012 Loop instruction corresponding to the for() statement
- 1016 Assembly instruction pertaining to audit
- 1020 Assembly instruction pertaining to audit
- 1024 Perhaps the final assembly instruction pertaining to the audit
- 1028 Assembly instruction pertaining to addition of two numbers
- 1032 Assembly instruction pertaining to addition of two numbers
- 1036 Assembly instruction pertaining to addition of two numbers
- 1040 Assembly instruction pertaining to addition of two number

FIG. 14

Modified assembly code

- 1000 Start address of Add program in memory
- 1004 Some assembly instruction pertaining to initialization of Add program
- 1008 Perhaps another initialization related assembly instruction
- 1012 Loop instruction corresponding to the for() statement
- 1016 Assembly instruction pertaining to addition of two numbers
- 1020 Assembly instruction pertaining to addition of two numbers
- 1024 Assembly instruction pertaining to addition of two numbers
- 1028 Assembly instruction pertaining to addition of two numbers

FIG. 15

PREDICATED LOOPING ON MULTI-PROCESSORS FOR SINGLE PROGRAM MULTIPLE DATA (SPMD) PROGRAMS

FIELD

The present disclosure is in the field of multi-processor processing or parallel processing, and more specifically, predicated looping on multiple processors for Single Program, Multiple Data (SPMD) programs.

BACKGROUND

Certain microcontrollers (e.g., Automotive Realtime Integrated NeXt Generation Architecture (AURIX) microcontrollers) are a multi-processor based architecture. Users thus have the ability to execute Multiple Instruction Multiple Data (MIMD) styled programs on these microcontrollers. A Single Program Multiple Data (SPMD) program is a type of MIMD that allows the same program to execute on each of the CPUs of the microcontroller but on a different data set.

However, with the onset of expanded computational power with more compact designs, many-core systems on a chip can include a specific many-core system on the chip to be designated to a particular application or task. As such, there is need for an increase in processing speeds and efficiency among such many-core systems with many processing units on a single microcontroller.

BRIEF DESCRIPTION OF THE DRAWINGS

FIG. 7 is another example of high-level code and corresponding Assembly Language code according to various aspects described.

FIGS. 14-15 are example Assembly Language code comparisons with the ZOL device according to various aspects described.

DETAILED DESCRIPTION

Figure 1:
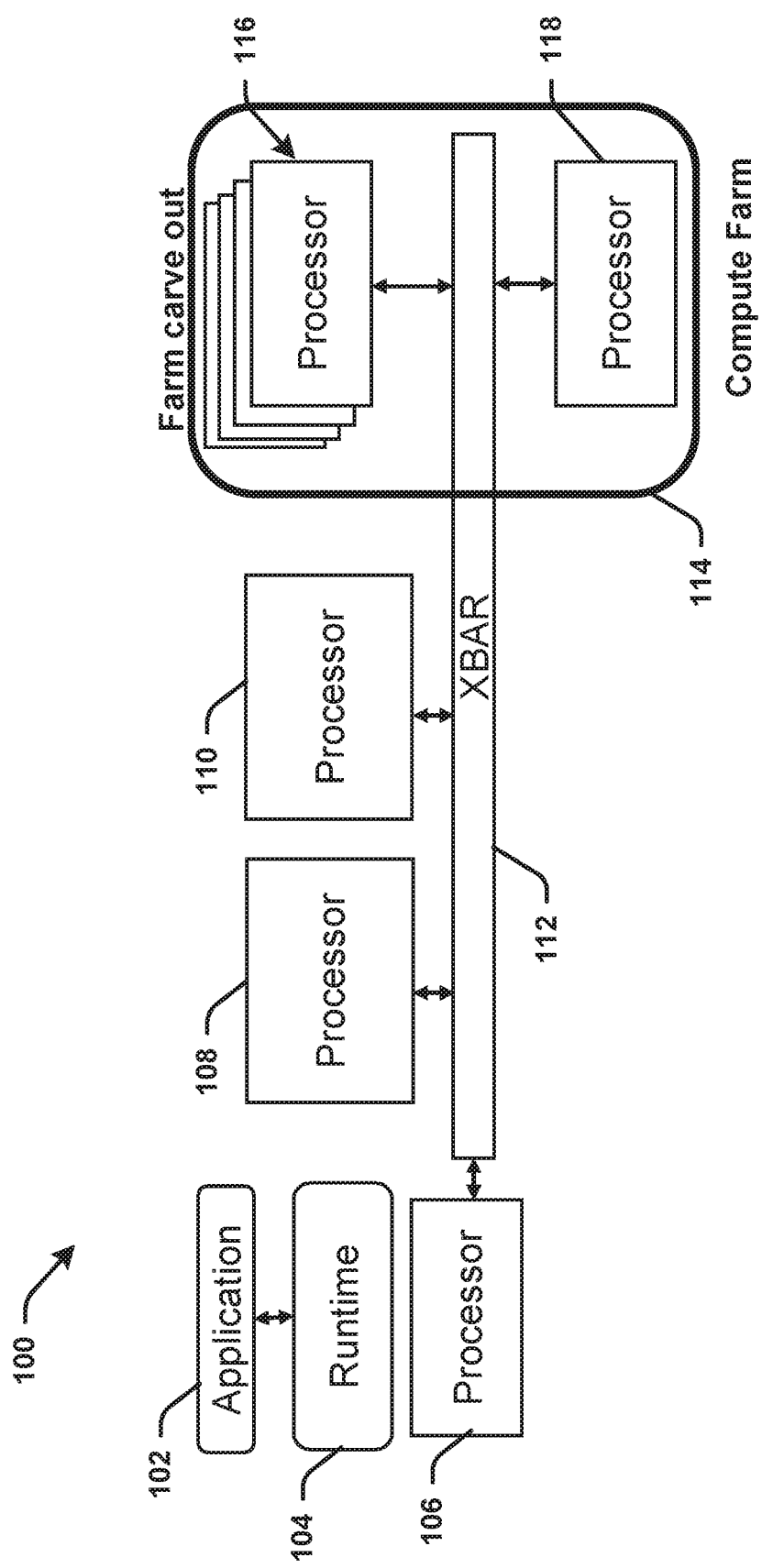
FIG. 1 illustrates a block diagram illustrating a multi-core system with a compute farm according to various aspects (embodiments) described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, to the extent that the terms "including", "includes", "having", "has", "with", or variants thereof are used in either the detailed description and the claims, such terms are intended to be inclusive in a manner similar to the term "comprising".

In consideration of the above described needs or desires of parallel processing with many-core systems, various embodiments disclose one or more devices employed in parallel processing systems. A microcontroller, for example, can be configured with a multi-processor architecture for single program, multiple data (SPMD) parallel processing of an SPMD application. This processing device can include, for example, a Zero Overhead Loop (ZOL) component/device as a part of, or coupled to, each of a set of computer processing units (CPUs) clustered as compute farms to perform SPMD parallel processing with a plurality of threads. The ZOL can be a part of each CPU or shared among the CPUs of the multi-processor architecture. Predicated looping can be generated by performing an audit of each thread to enable an execution of a loop instruction while skipping one or more overhead instructions by the task(s) or logic to be executed by the thread. The audit can include a determination by the ZOL of whether the thread has an affinity or is associated with a loop iteration.

If an affirmative determination of the audit is made so that the thread is found to be associated with a loop iteration or data element of a data set, then the overhead instruction(s) are eliminated or removed so that only the loop body (e.g., the business logic/task instruction) is processed in execution of the loop. In this disclosure, a loop body can be referred to as a business logic/task instruction of a loop (for loop or other loop instruction) in software. These operations can be performed in an SPMD mode of operation activated by a signal trigger (e.g., SPMD_enter instruction). A ZOL device can remove performance of the overhead instructions of a loop from software, and place the execution in hardware for the loop body of SPMD loop instructions to be performed alone in software of the thread. As such, loop instructions associated with a task (or business logic) of threads no longer require overhead audits to be done in the thread or software for each thread to be executed. The association (or affinity) of a loop iteration or data element of the data set can be predicated in hardware so that the software of SPMD threads only processes the loop body of the loop instructions, and thus, without performing the audit/overhead instruction(s). This enables a speedup of the processing speeds in SPMD parallel processing, increasing the computational capability and efficiency for SPMD application, for example.

In other aspects/embodiments, the ZOL device can be enhanced with particular trigger instructions (e.g., SPMD_enter, SPMD_exit) for entering and exiting the SPMD mode of operation that predicates whether looping applies to particular data element(s) of a data set with a given thread. If the answer is yes, then the thread executes the loop body of the instruction without processing any loop overhead/audits. The ZOL device can further include various different assignments of particular registers to operands (e.g., #My Thread, #Block Size, #, #Max Threads). These operands can be retrieved from the particular trigger instruction (e.g., SPMD_enter or other SPMD instructions) in response to a branching or forking of a main thread for determining the affinity of a forked/secondary thread with a data element of a data set to a loop iteration, for example.

The ZOL device can also include an affinity calculator as hardware that performs the audit as a check of the SPMD loop for each thread to determine whether a thread among multiple threads of a SPMD application associated with a given data element of a data set. If there is an association (or affinity), the overhead instructions can be skipped in the processing of the loop body of the SPMD loop of the instructions by execution of thread. If not, a loop iteration or counter can be skipped over in a predicate state and a next iteration processed, further resetting a loop counter holding a loop count that mirrors a loop index, for example. As such, overhead instructions or the audited instructions can be processed in the hardware of the ZOL device without having to be processed at each thread for determining whether the thread is applicable to a given data element or not. An increase in computing can be gained by executing only the loop body of the instruction only, without the overhead instructions, to be processed in a thread.

The ZOL can also include a Finite State Machine (FSM) with one or more additional states, including a predicate state and a loop state that operate according to the SPMD mode or a non-SPMD mode, respectively, based on the SPMD trigger instruction (e.g., SPMD_enter). The information from the trigger instruction/signal for entering and exiting SPMD mode can be different for each of the threads and provide the auditing information for determining affinity of each thread to each loop iteration or data element at multiple different threads, for example. The predicate state of the FSM enables the skipping of an iteration of the loop instruction in response to a negative determination of the association with the loop iteration or data element to the particular thread. The loop state then triggers execution of the loop instruction without an overhead instruction in response to a positive determination of the association with the data element to the thread. Additional aspects and details of the disclosure are further described below with reference to figures.

FIG. 1 illustrates an example of a compute farm on a many-core system 100 that the various embodiments being disclosed can be configured with. The many-core system 100 can include an application 102, a runtime component 104, a processor 106, along with one or more other processors 108 and 110 coupled to the computer farm 114 via a bus 112.

The application 102 can include one or more programs or groups of programs as SPMD programs with SPMD instructions. Such SPMD programs can include particular business logic or a task to be executed that has been forked from a main thread, for example. Each forked thread or secondary thread can then comprise a same business logic or a same task to be carried out on one or more sets of data (data sets) that comprise any number of data elements (sub-portions or partitioned bytes of a data set) to be operated upon as a logic/task of a thread in software. Such forking can be enabled based on a computational threshold, a complexity of a particular program/sub-routine, or other factor that triggers a partitioning of data among data sets with particular data elements that are operated upon in parallel and comprise SPMD loop instructions for execution of software looping on the data set(s) with separate processing units. In such thread forking, multiple processing units execute a task in separate corresponding threads, each with their own copy of the data set(s) and each with different assignments to particular data elements within a unique copy of the data set(s).

A thread can be an instance of the SPMD program and each thread operates on unique data set. Thus, multiple threads of execution, with each operating on a unique data set can collaboratively solve a large computational problem. Each software thread allocated to a block of data or a data set can then perform a same set of operations. This implies that the data set (comprising data elements) is partitioned among threads and that not all data elements of the data set apply to a particular thread. Consequently, each thread determines whether a data element of the data set is allocated to it, as by an audit as a set of overhead instructions. If affirmatively allocated, the thread applies the necessary operations on the data element(s). When the determination is negative, the thread moves on to the next data element. This determination of applicability of a data element to a thread and subsequent application of operations on the applicable data element is performed in a loop. The loop terminates only after all of the data elements have been processed.

In SPMD programs, multiple autonomous processors can be called to activate simultaneously to execute a same program (sub-program) at independent points of the main program. With SPMD operation instructions (e.g., SPMD loop instructions), tasks can be executed on central processing units (CPUs), such as CPUs of a compute farm that is clustered (or configured) with a specific purpose/a same task for each CPU. Such tasks are also the same among the CPUs and executed as threads with particular data elements of a data set being executed upon in parallel among the independent data sets of each thread.

The application 102 can be associated with a runtime system 104 that can provide an environment for executing the programs by interfacing with an operating system, laying out memory, accessing variables, passing of instruction parameters, or setting up threads or other dynamic features for a particular program language (e.g., C++ language, or other such software language). A processor 106 can further be associated with interfacing the application 102 and runtime system 104 thru a bus 112 (e.g., a crossbar switch, matrix switch, or the like) to one or more other processors 108 and 110 and a particular compute farm 114.

The compute farm 114 can include a plurality of processing units 116 and another processor(s) 118, each assigned to its own copy of the same data set with the same data elements, but different assignments of the data elements partitioned thereto. As more and more processors are packed into a system or a system on a chip (SoC), some of the CPUs, like the CPUs 108 and 110, for example, can be assigned for legacy applications, whereas the CPUs 116 and 118 can be a part of what is known as a compute farm 114 in the case where a new application may require extra computability (e.g., for SPMD loop instructions).

In one example, a portion of software running on the CPU 108 or 110 may require a capability that may not be natively offered by the CPU 108/110 itself, such as a computational capability, or amount of data that exceeds a predefined threshold for given sets of data. In this case, the software running can decide to perform a forking operation or dedicate a portion of its computing to the compute farm 114 as a set of special purpose processing units to operate a particular task or job. Such a computation then can get distributed over many of these CPUs 116/118. The result is that processing time that would have resulted from one CPU (e.g., 118) can be reduced significantly when operating on multiple CPUs 116/118 on the compute farm 114 in parallel processing, especially with SPMD parallel processing for SPMD loop instructions, for example.

Each of the processors or CPUs 116/118, for example, can be a reduced instruction set computer (RISC) processor or other processing device, which can include a computer instruction set or instruction set architecture (ISA) that enables the computer's microprocessor (e.g., 118, or other microprocessor) to have fewer cycles per instruction (CPI) within the CPU architecture. These processors 114 can have a regular instruction pipeline flow with load/store architecture, for example, in which the memory is accessed via specific instruction rather than as a part of most general thread or a main thread instruction. Such CPUs can also be driven by a clock that enables different processor devices or units to process instructions based on a division into a series of sequential steps so that each unit is working together in a pipelined manner across a single clock cycle.

One or more compute farms 114 can be supported in the form of different programming languages, in which some programming languages such as C, open CL (Computing Language), or the like can support compute farms 114, while others do not, but the same embodiments herein can be applied to one or more different languages together or separately for various tasks. When a programming language does not support compute farming, then there could be alternative available in the form of libraries, for example.

Regardless of the software language, the program of the application 102 (e.g., an SPMD application) can use any language with a functional characteristic that can be referred to as Thread-Fork-Join. Thread-Fork-Join operations can be a way of setting up and executing parallel programs, such that execution can be branched off in parallel at designated points in a program or application 102. For example, if an application 102 is running on the processor 106/108/110 or CPU 118 as a piece of a program (e.g., a sub-program or functional portion of the program as a subroutine, a function, or the like) running, this can basically be considered a single main thread of the program running on this CPU. At some stage of program operation, this single thread may have to execute something which requires tremendous computational capability or that exceeds a computational/processing capability threshold, or some other computational parameter/criteria/threshold being satisfied. In such a case, a CPU/software language can fork out copies of the particular procedure (portion of the program with one or more instructions such as involving SPMD loop instructions), as the procedure that it wants to be accelerated onto many CPUs 116 on this compute farm 114. This is an action of installing multiple threads of execution, referred to as forking. As such, a thread can fork many other threads (as secondary threads, for example) to accelerate a computation or a certain task. Once each of those secondary threads completes its job by executing the instruction, they each can then signal back to the main thread to indicate completion. These threads can include the same processes or instructions (business logic/task) to be executed from a sub-routine or other portion of an SPMD application, while having their own copies of a data set to operate upon with different data elements associated with each thread, respectively. Thus, each secondary thread comprises its own copy of the data sets with the same data elements of a data set, but will have an affinity or a partition of different data elements among the data sets upon which to operate on, for example. The audits or overhead instructions can be executed for each data element on each thread.

At completion, the main thread can retrieve the results of each of the delegated threads/secondary thread of the compute farm processing units 116 and continues processing for a particular output, which is referred to as joining, or joining the forked results into the main thread. These operations overall can be referred to as Thread-Fork-Join operations. This class of programs utilizing Thread-Fork-Join operations can also be referred to as a Single Program Multiple Data (SPMD) program/application/instruction. It is the same program that is running on all of the CPUs 116, and operating on their own different copies of data sets including data elements, as stated above.

Each SPMD program can also further include SPMD loop instruction(s), for example. The SPMD loop instruction(s) can comprise one or more loop audits together with a loop body that executes a loop on one or more data elements of a data set to obtain a result of the data in software.

In an example, the CPU 108 could be designated to process a thousand bytes of data, and thereby exceed a processing time threshold as a trigger for forking operations. Thus, if five CPUs 116 and 118, for example, are in this computer farm cluster 116, then each of the CPUs 114 of this cluster could be allocated 200 bytes. Each of the CPUs 114 are then all running the same procedure (or portion of software) as a particular task, but operating on a unique partition of the data elements of the data set, where a unique partition of the thousand bytes as a data set that was originally intended to be operated upon by a main thread or program. The examples herein can include any number of CPUs 114 or amount of bytes of data as a data set, with particular data elements being one or more subsets of the data of same or equal amount of data among the data elements.

Figure 2:
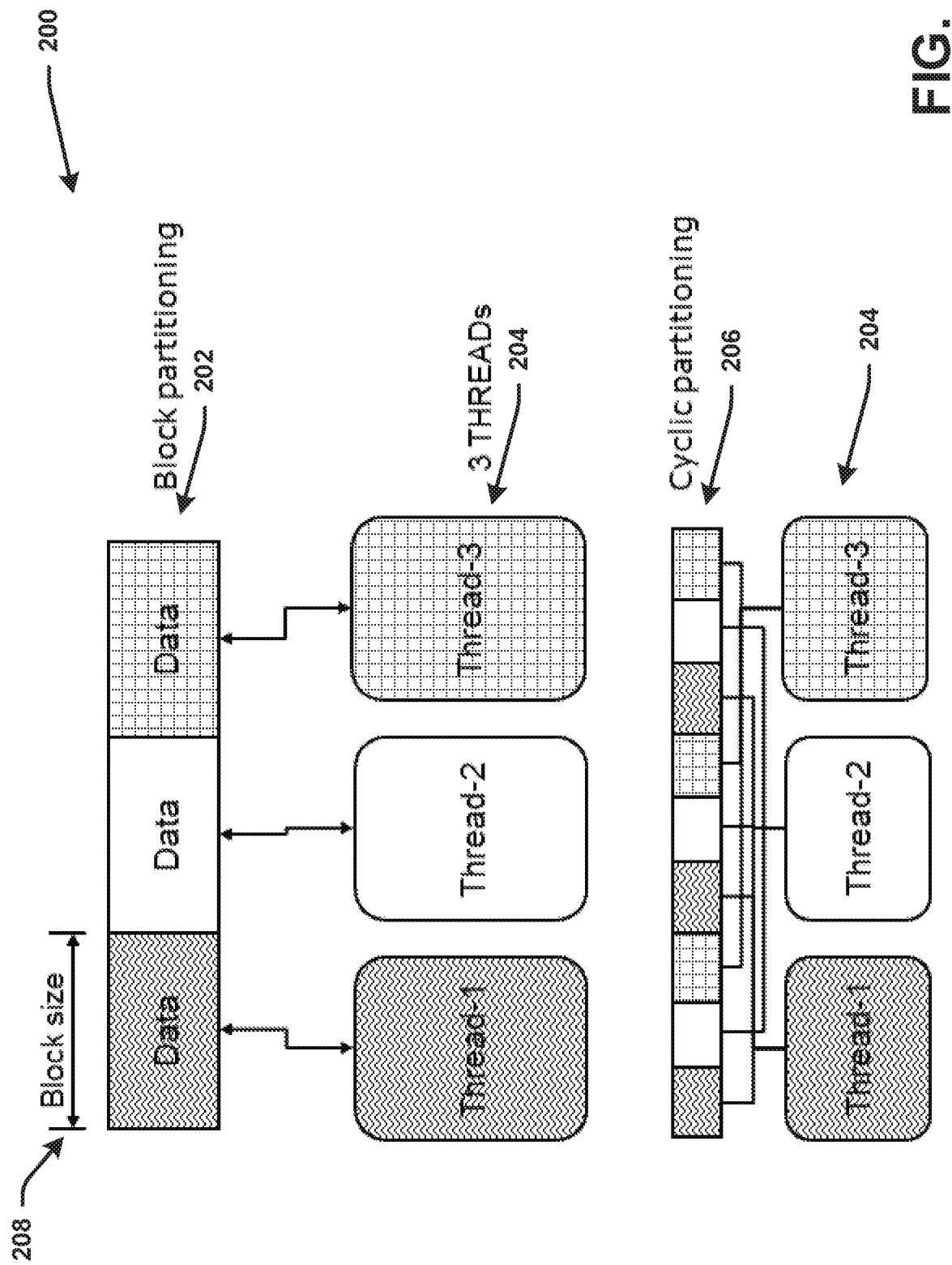
FIG. 2 illustrates a block diagram illustrating different data partitioning for a data set according to various aspects described.

Referring to FIG. 2, illustrated is an example of data partitioning 200 for processing SPMD loop instructions such as by a compute farm 114, or the like. A block partitioning 202 and a cyclic partitioning 206 is illustrated to demonstrate examples of different techniques in which data elements could be partitioned to particular tasks or threads. However, any partitioning process could be utilized herein and the present disclosure is not limited necessarily to any particular method or number of different methods of partitioning data elements of a data set among various threads.

For example, block partitioning includes contiguous data elements that form a data set and are associated with different corresponding tasks (Task-1, Task-2, Task-3), respectively, as different threads executing a task on different data elements of a data set. Each of the threads 204 can include an instance of the SPMD program, and each thread can operate on a unique data set, such as its own copy or version with same/similar data elements. For example, each thread can perform a same set of operations/processes that include a set of instructions (e.g., SPMD loop instructions) performed on data allocated to it. Thus, the data set can be partitioned among the threads with a same data set including elements of a block size 208, so that not all data elements of a data set apply to a thread, but all or most of the data elements will be associated with or have an affinity to at least one of the threads.

Such SPMD loop instructions are single program multiple data loops performed in software normally as a control instruction that enables a block of instructions, the loop body, to be executed repeatedly in succession, such as with a counter, and an operation or operand, as by iterative processes for looping operations. Block partitioning 202 and cyclic partitioning 206 can be different ways of determining applicability of a data element to a thread that is performed by software. In block partitioning, a block of contiguous data elements of BOCK_SIZE 208 is allocated to a thread 204 (annotated in the figure as Task, such as Task-1, Task-2, Task-3).

In cyclic partitioning 206, for example, a data element can be first allocated to a thread 204 of software execution. The next data element can be allocated to the next thread, and so on. Once all of the threads 204 for a particular portion of software (e.g., sub-routine, callout, etc.) have been assigned a data element each, the next data element from the data set can be allocated to the first thread. This allocation can repeat until all of the data elements of a particular data set (each given different hash marks/fill patterns) have been allocated to the threads 204. As such, each thread can include a task that processes an instruction such as a loop instruction as a set of instructions to perform a particular logic on data elements in a loop. This loop instruction can include overhead instructions that are audits for each loop body that can be removed from each loop instruction and performed in hardware rather than the software according to embodiments or aspects herein. Thus, only the loop body can be processed by software while each thread is determined/indicated by hardware (e.g., associated CPU) what data elements that the thread is associated with. This can give a significant speed-up as a result of the overhead instructions no longer being processed before each loop iteration in the thread itself, but removed to hardware (e.g., in the ZOL device).

In one example, the following piece of C code can be one way of determining applicability of a data element to a thread by normal C convention.

```
for (int i=0; i<N; i++)
{
    if( (i/BLOCK_SIZE) mod THREADS) == MYTHREAD)
    {
        Process the data element indexed by the iterator i
    }
}
```

However, this solution has a disadvantage that there are two division operations at the start of the loop only to determine if the iterator "i" corresponds to a thread 204 identified as MYTHREAD for a given BLOCK_SIZE 208 and number of THREADS 204. As such, the loop instruction line: if((i/BLOCK_SIZE) mod THREADS)==MYTHREAD), can be an example of the SPMD loop overhead, or audit as referred to herein with one or more SPMD loop instructions. This auditing exercise itself can contribute to several processing or instruction cycles as it involves potentially register MOV, Memory LOAD, arithmetic division (DIV), and logical compare (CMP) operations that utilize software execution times or cycles, a part from the execution of the loop body itself, the heart of what is being demanded for operation.

The overhead instruction itself ensures that in order for software to process an iteration of a loop instruction in a secondary thread it has to determine whether the data element is meant for/assigned/partitioned to the thread (has affinity to it or corresponds thereto), and then the thread can process the data element to execute the loop body of the SPMD instruction. However, eliminating these SPMD loop overheads or audits in software and performing them in a ZOL device can allow for greater efficiency, less overhead in the loop executions and increase the speedup of SPMD parallel processing for the overall SPMD application or main program.

FIG. 2 is an example with three different threads 204 (associated with a task) as illustrated with different fill patterns. The addresses are directed such that each thread 204 operates on its own unique copy of a data set, all with similar data elements, which are partitioned subunits or smaller pieces of bytes making up the data set. If all of the computation(s) were to be performed by one CPU (e.g., 110), then it operates on the first data, then the second data, and so on in any direction (illustrated as associated with Task-1, Task-2, Task-3, respectively). Although threads are labelled as Task-1, Task-2, Task-3, the task of the different threads can be the same (e.g., an add operation between two or more data sets or some other set of operations). However, since the CPU 110 can have delegates CPUs, for example, as in SPMD threads being forked each delegate CPU or processing unit performs the loop logic or the assigned task with a loop instruction by operating on a unique copy of the data of these partitions: one, two, three, where the main program comes from, but they are operating on unique data as multiple data, or single program multiple data (SPMD). In other words, each data set of each thread performs a task on its own partition of the data within the copied data set, and not all data elements of each data set of a particular thread will be operated upon. Some data elements are associated with (have affinity to) a particular data thread, while other data elements are to be operated on (have affinity to) another data thread.

Regardless of how the data (data elements of a data set or data sets) get partitioned (e.g., block partitioning or another method of partitioning) each of these threads 204 would otherwise perform an audit to ask itself whether a particular piece of data (data element) that it has been asked to operate upon really belongs to (has affinity to) it or not. This is a determination that each thread performs an auditing by the SPMD loop overhead, such the example as follows if ((i/BLOCK_SIZE) mod THREADS)==MYTHREAD) for each thread, and each CPU to execute this part of the program. This is one example, although other codes can also be implemented according to a same or similar purpose. Only if this audit passes affirmatively will the data element indexed by the iterator i be consumed or be operated on by that particular CPU as the associated thread.

Embodiments herein remove the auditing from the software loop instruction for SPMD instructions of the thread and perform them in the hardware of a ZOL device by enhancing the ZOL with components that allow the software to run in less cycles or a single cycle for the loop body of the loop instruction to be processed alone. Thus, this can be performed without the audit line if ((i/BLOCK_SIZE) mod THREADS)==MYTHREAD) for each thread in software, or a similar code to just execute the loop body.

Unfortunately, the piece of code for the SPMD loop overhead is not very trivial. It involves several arithmetic steps: division(s), a comparison, a load-store instruction to load the iterator i, the block i, etc., and thus, can consume a significant number of software cycles. If a thread were to operate on a large number of data elements of a data set and for each data element this audit is to be performed, a large number of cycles can be consumed. In addition to the time being consumed, to actually perform a useful operation, a lot of processing resources could be consumed to perform all of these audits. Embodiments therefore eliminate this loop overhead from the SPMD loop instruction execution in software, thus leading to faster execution of each of these threads.

Figure 3:
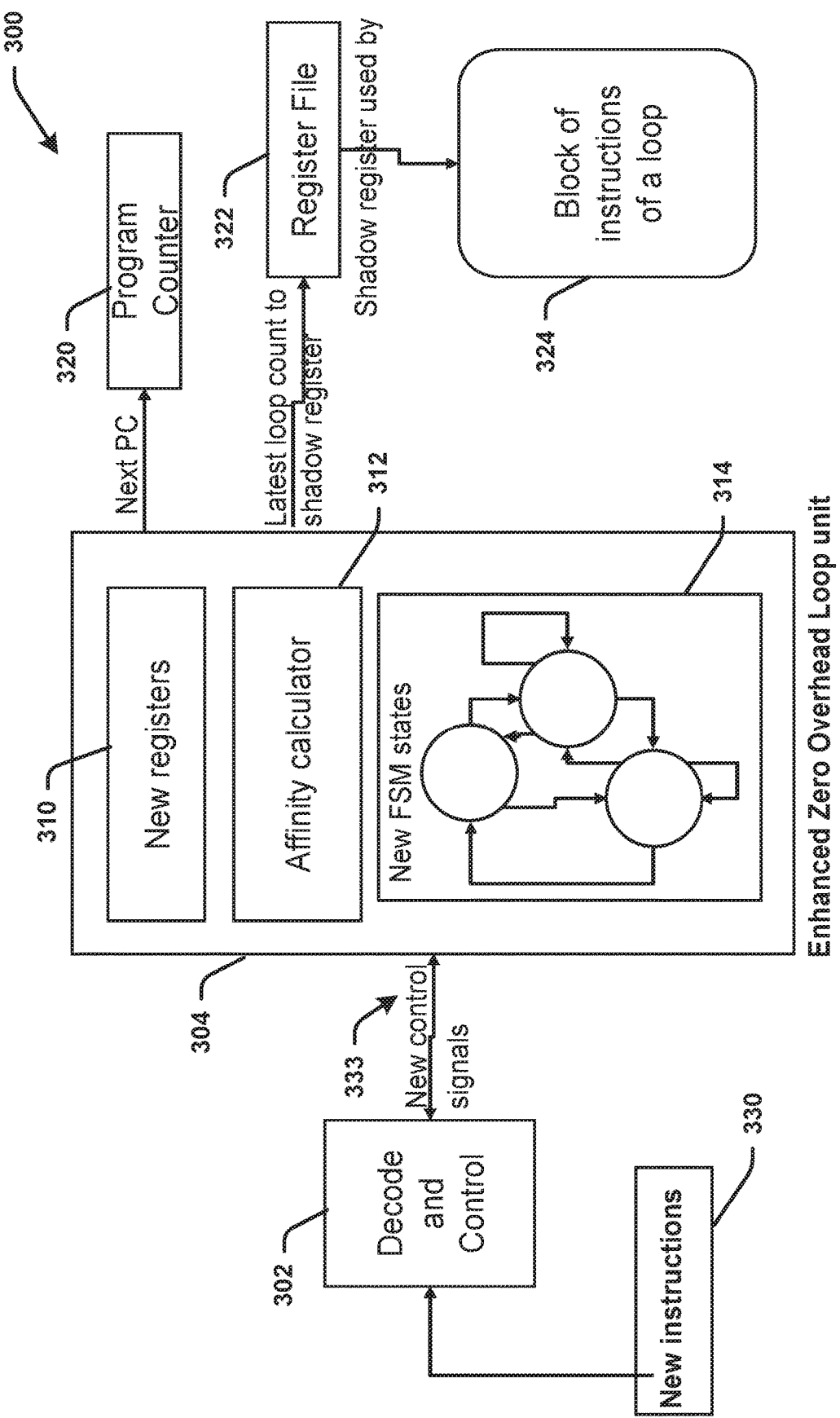
FIG. 3 illustrates a diagram of aspects of an enhanced Zero Overhead Loop (ZOL) device and related components according to various aspects described.

In an embodiment, these audits in software are eliminated/moved into a hardware component as a Zero Overhead Loop (ZOL) unit/component/device, illustrated for example in FIG. 3.

FIG. 3 illustrates a ZOL system 300 for predicated looping on one or more processors (e.g., compute farm 114). Predicated looping refers to the functioning of the extended ZOL device 304. In particular, the ZOL device 304 is configured to perform audits and allow execution of only a loop body of SPMD loop instructions, or skip execution of the loop body of the loop instructions while also preparing for a next loop iteration. Thus, the overheads (overhead instructions) of the audit can be greatly reduced leading to an improved speedup in SPMD parallel processing.

Figure 6:
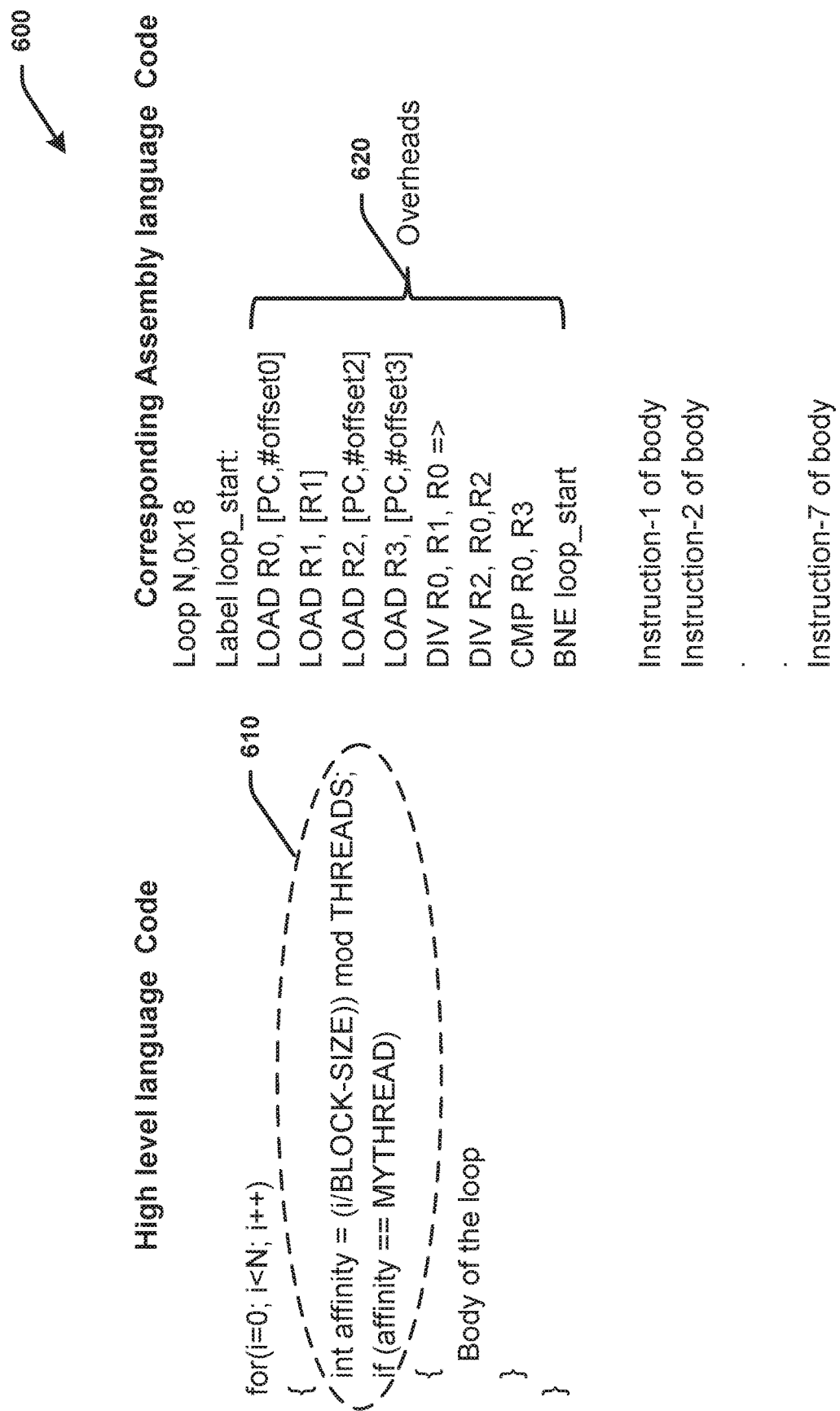
FIG. 6 illustrates an example of high-level code and corresponding Assembly Language code for loop instruction(s).

Overheads or overhead instructions can refer to those instructions identifying a thread with a data element of a data set, which could have been forked to multiple threads to be performed on a compute farm 114 as described herein. Referring briefly to FIG. 6, a set of loop instructions 600 in software are provided in both high level language Code on the left (e.g., C or C+, or other) and corresponding Assembly Language code on the right. The overheads at 610, as discussed above, identify the thread with the particular block of data or data element(s). The audit determines if the iterator "i" corresponds to a thread identified as MYTH-READ for a given BLOCK_SIZE and number of THREADS 204. Thus, the software does a check or audit to determine whether the block of data is associated with the thread, and based on the check performs a body of a loop, if the check is affirmatively affiliated. Similarly, the overheads 620 for the Assembly Language equivalent to the high level code on the left comprise audits that include load operations, division operations, compare (CMP) operations and a branch if not equal (BNE) operation at least.

Returning to FIG. 3, the ZOL component/unit/device 304 can operate to remove these overhead instructions and perform them in lieu of being performed in software of the thread. The ZOL component 304 includes a set of registers 310 for particular operands to be obtained from an SPMD mode trigger signal. These registers are not integrated or a part of the ISA of the chip, but separate and associated within the ZOL 304 to be functionally coupled to an affinity calculator 312 and a Finite State Machine (FSM) 314 that specifically incudes additional states: comprising an inactive state, a loop state, and a predicate state. However, this is one implementation, other states can be included also as part of the FSM 314, for example.

In an aspect, the ZOL 304 includes an SPMD mode and a non-SPMD mode of operation. The SPMD mode can be entered into by means of a particular instruction (e.g., "new instruction" 330) including spmd-enter and spmd-exit. The spmd-enter can include the following operands: MYTH-READ, BLOCK-SIZE, THREADS, each stored in an associated register of the registers 310 in the ZOL unit 304 after being derived as new control signals 333 from the instruction 330 by the decode and control component 302. This particular instruction, spmd-enter, can be configured as a trigger to the ZOL 304 for entering the SPMD mode, while another trigger or instruction referred to as spmd-exit initiates an exit from the SPMD mode to a non-SPMD mode.

Figure 4:
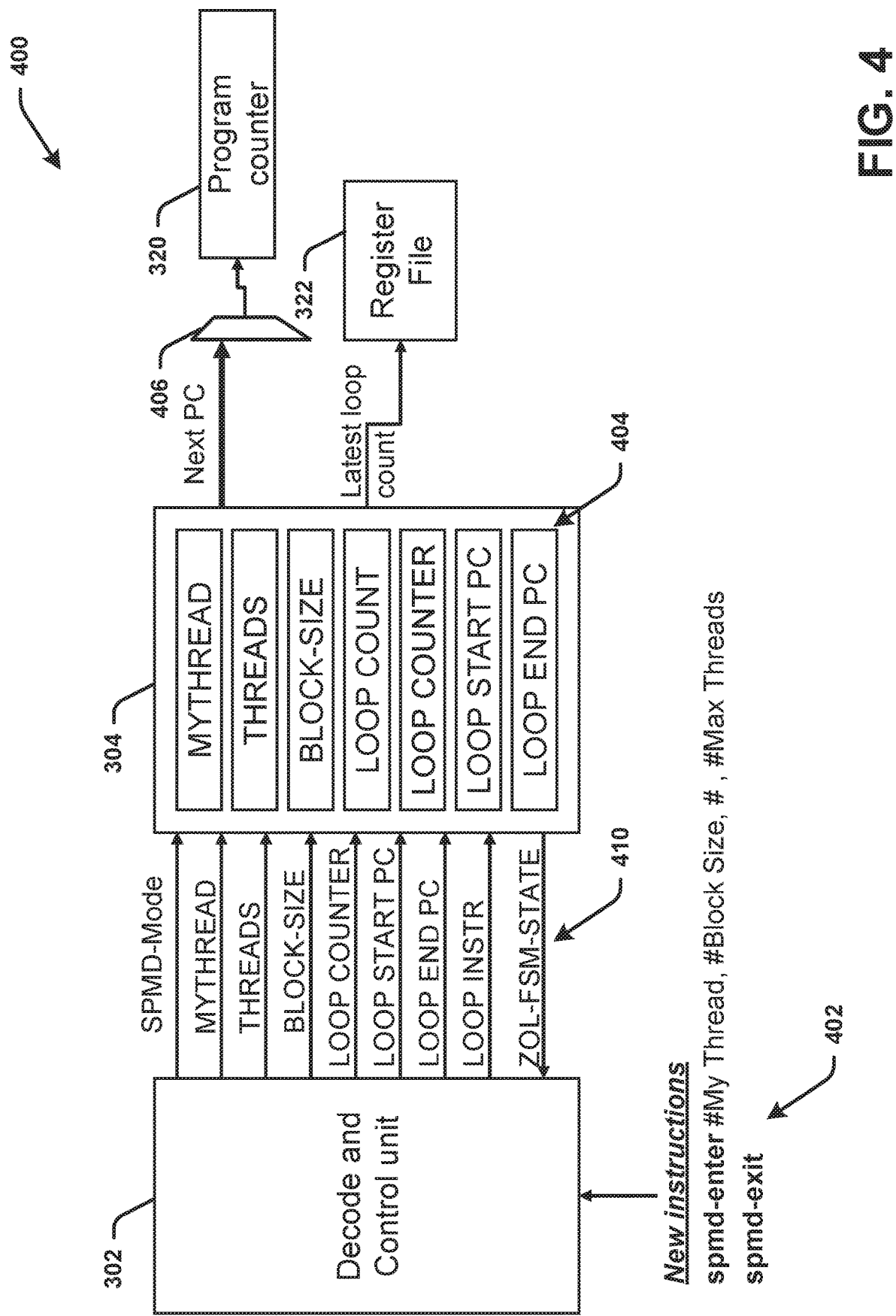
FIG. 4 illustrates a diagram of aspects of the ZOL device with interface and decode/control components according to various aspects described.

Trigger of the SPMD mode enables predicating of the audit in ZOL device 304 of the CPU of the thread, rather than in the execution of the software as a part of the SPMD loop instruction. Then in the SPMD mode if the ZOL device 304 determines there is an affinity of a data element to the thread in a particular loop iteration, the loop body of the loop instruction is executed, while other threads execute the same audit with the same data element concurrently. In the case where there is no affinity with a particular data element (where the data element has affinity or is associated with another thread), then a loop counter (as shown in FIG. 4 with a total number of iterations) of the ZOL 304 can be reset and an address set to the loop body by a modification of an address in the program counter 320. The loop count with a latest loop iteration can mirror a loop index and is also shadowed in the register file 322. The loop count can be incremented and decremented with a latest/current loop index.

The ZOL unit 304 can receive parameters (operands) derived from the mode instructions 330 from a decode and control component 302 that receives and decodes them for operation in the ZOL 304, and then stores them in the designated registers 310 (e.g., My Threads register, Threads register, and a Block-Size register) for use of the affinity calculator 312. Thus, once the spmd-enter instruction is decoded, the decode and control component 302 asserts an SPMD-Mode signal for the ZOL device 304 to enter the SPMD mode. The ZOL device 304 then loads its registers (e.g., My Threads register, Threads register, and a Block-Size register) with the operands (e.g., MYTHREAD, BLOCK-SIZE, THREADS) of the instruction. In response to a loop instruction being fetched and decoded, the instruction decoder 302 then informs the ZOL 304 that execution of the loop body or instruction can commence at (or in) a next cycle (e.g., fetch execution cycle, or the like).

Another all-purpose register can be configured as a shadow register 322 reflecting the latest loop count in the ZOL 304. A software compiler can ensure that this shadow register 322 is used by the body of the loop to retrieve the loop count (or the iteration count). Contents of the shadow register 322 can be pushed to stack before commencement of looping and popped out of the stack after completion of looping operation (e.g., a FIFO buffer or the like).

Referring to FIG. 4, illustrated is an example ZOL interface system 400 with the ZOL component/unit/device 304 and other components such as decode/control unit 302. The interface 410 comprises inputs and outputs comprising an SPMD-mode trigger, operands decoded from the spmd-enter instruction 402, comprising MYTHREAD, THREADS, a number or id of a thread, and an indication (e.g., a number) of other threads, determination of a loop instruction, a loop counter, a loop start program counter (PC), a loop end PC, and a ZOL-FSM state. The ZOL device 304 can include registers 310 or 404 that include a My Threads register, Threads register, and a Block-Size register, a loop count register, a loop start PC register and a loop end PC register, for example. The latest loop count can be stored in an external shadow register 322 file. A next program counter determined by the ZOL device 304 is provided to a multiplexer 406 with an output to a program counter 320.

Upon receipt of the commencement or trigger (e.g., spmd-enter) 402 for loop processing from the decoder 302, the loop counters and registers (404 in FIG. 4) (e.g., the MyThread register, Threads register, and a Block-Size register) operating with the addresses of a first instruction (e.g., Loop Start PC) and a last instruction (Loop End PC) of a loop (loop instruction) are initialized within the ZOL 304. The spmd-enter instruction initializes the My Threads register, Threads register, and a Block-Size register, while a decoding of a zero overhead loop instruction can initialize the Loop Start PC, Loop End PC, and the loop counter, for example. The FSM 314 of the ZOL unit is enhanced to search for an active SPMD-Mode signal and enter into a predicate state. If asserted in the SPMD Mode, the ZOL unit 304 then performs the audit rather than the software of the loop instruction in the thread. If the audit determines that the latest iteration of the loop does not apply to the particular thread in question, then the loop count is either incremented (in case of up counting) or decremented (in case of down counting) and the Program Counter (PC) ID of the program counter 320 is forced to the start address of the first instruction of the loop. Thus, a loop iteration can quickly be turned into a no operation or NOP and the next iteration scheduled for a subsequent audit with a next data element of the data set in the same thread. Conversely, if the audit by the ZOL 304 determines that the latest iteration does indeed apply to the thread (THREAD) in question, the program counter 320 is simply set to the address of the first instruction of the loop without the loop count being modified. In such a case, the FSM of the ZOL will allow the data path to proceed with execution of instructions of the loop 324. Once all iterations of the loop are completed, the ZOL 304 resets itself such as by re-initializing registers 310, for example.

The ZOL 304 is thus configured to eliminate loop overheads so that each thread only executes the loop body of the instructions of a loop without any of the audit instructions in a mother loop of a main program and/or SPMD loop overhead being performed in each thread. The counting or incrementing of the loop count can then be performed in the hardware and once the hardware determines that the number of iterations which this loop was originally scheduled for has been met then the loop can be automatically terminated by the hardware as the ZOL 304.

The affinity calculator 312 can be configured as the hardware equivalent of the software audits. The affinity calculator 312 can operate audits on data which repeats from data in the new registers 310 of the ZOL 304, which in turn have been programmed with the data retrieved from the new instructions 330. The affinity calculator 312 can output a binary output that indicates whether a particular thread has affinity to or is partitioned to a particular data element among the data set. Each thread among multiple CPUs performs the same audit for each data element. If one thread has affinity, it can begin processing the loop instruction according to behavioral states of the FSM 314, while other threads without an affinity advance toward performing the audit for a next data element. After processing the loop body in the thread with affinity, the audit for this next data element can also be audited for the particular thread also.

According to the configuration of the ZOL device 304 and interface structure, the program counter 320 can be configured depending on whether an iteration of a loop is applicable to a thread or not. The program counter 320 indicates from which location in memory the first instruction of the business loop or the actual task to be performed for the loop body is to be fetched. As such, instead of the threads being executed similarly to the code 600 with the audit 610 and corresponding Assembly Language code on the right side corresponding to the audits 620, the threads can execute code 700 as in FIG. 7. The ZOL device 304 is configured to eliminate the overhead instructions or audits, and from the threads and execute them in hardware rather than as a part of software. The ZOL device 304 can automatically skip an iteration of a loop if it is failing the audit in the hardware. For example, if there are ten iterations and iteration number #8 does not belong to a particular thread, the execution flow moves automatically to iteration #9 by completely skipping this audit. When the ZOL component 304 determines that a certain iteration is no longer applicable to the thread, rather than asking the program counter 320 to fetch the instruction from the next address, the program counter 320 is reset to a top of the loop again, or an address designating a loop beginning.

As touched upon above, the instructions 402 are utilized to determine when to enter or exit SPMD mode. These assembly instructions, for example, are spmd-enter and spmd-exit. The assembly instruction spmd-enter has three operands. Each assembly instruction has an op code explaining or meaning basically the operation the CPU is to perform and operands indicating the data associated with the instruction. The operands associated with the spmd-enter includes an operand referred to as MY THREAD that indicates or identifies the particular thread. The Block Size indicates or identifies an amount of data or what is to be executed, and THREADS indicates what other threads operate on a similar data set, but different blocks or data elements. The spmd-enter instruction is decoded resulting in several signals or several information being generated for the ZOL 304.

When spmd-enter is executed, the spmd-mode signal gets activated. The data MY THREAD gets forwarded from the decode/control unit 302 on lines 410 to the enhanced ZOL 304. The Block Size operand is also forwarded to the ZOL device 304, along with the Max Threads, on the corresponding interface thread line 410. The ZOL device 304 then takes data and programs it into the relevant register 404, the MY THREAD information into the MY THREAD register, the THREADs information into the THREAD Register, and the BLOCK SIZE data into the BLOCK SIZE register.

Without the audit lines of code for the threads, as illustrated in FIG. 7, the ZOL device 304 uses the registers with the operands as well as the loop count, to extract the data for hardware to perform the audit or overhead lines of code. This data can be passed along with the spmd-enter, spmd-exit instructions. As such, the C code gets synthesized into this Assembly language code at FIG. 7, where the For-Loop or loop body of the instruction tends to be zero overhead loop and is regulated to just this loop instruction or the loop body without overhead compared to the code in FIG. 6. Thus, instead of the overhead instructions being executed along with the body of the loop there are no overheads with software execution. This is replaced with the instruction loop only and counting is done in the ZOL 304 where there are no longer overhead instruction.

Figure 5:
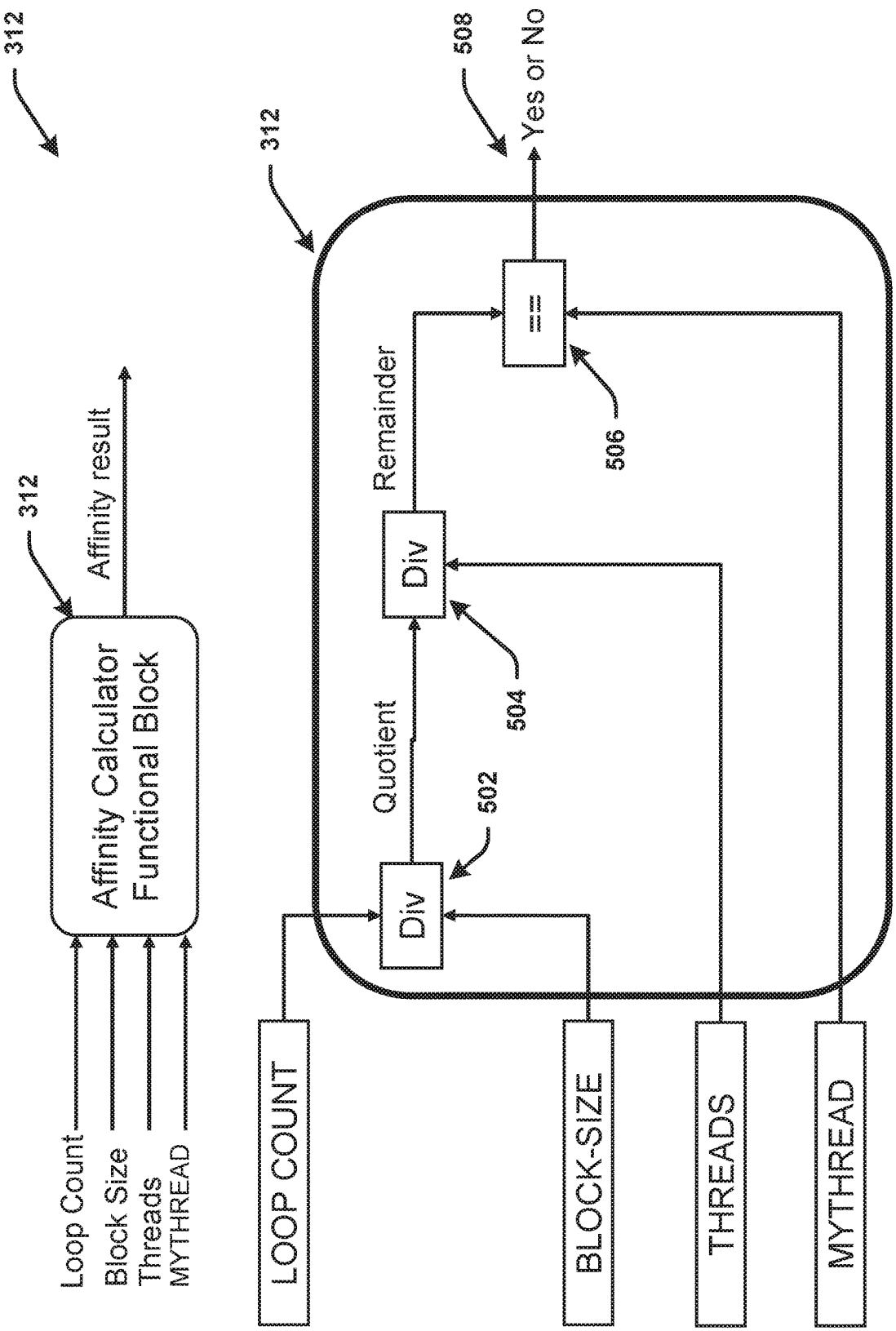
FIG. 5 illustrates another diagram of an affinity calculator of the ZOL according to various aspects described.

Referring to FIG. 5, illustrated is an example affinity calculator 312 in accord with a ZOL device 304. The affinity calculator 312 comprises a first division component 502 connected to a second division component 504 and a comparator 506. The first division component 502 receives inputs from the loop count and Block-size registers. The second division component 504 receives input from the THREADs register and the quotient result of a division operation first performed by the division component 502 to provide a remainder as an output to the comparator 506. The comparator 506 receives the MYTHREAD identifying the particular thread and compares it to the output remainder of the second division component 504 in order to provide a binary output 508 as a yes or no for having an affinity to a particular loop iteration with a data element of a data set. In this manner, the affinity calculator 312 determines whether an iteration is applicable or not for an additional state of the FSM referred to as a predicate state.

The data as inputs to the affinity calculator 312 can be extracted from the instructions 402 as spmd-enter and spmd-exit. The compiler understands spmd_on and spmd_off compiler intrinsics and then generates the spmd-enter instruction and spmd-exit instruction accordingly as an example. Spmd_on and Spmd_Off are merely examples of what such intrinsics are likely to be. When the CPU executes the spmd-enter instruction, the data/the operands of the spmd-enter instruction get extracted by the decode unit 302 and then they get stored in the three registers, Block-Size, THREADS, and MYTHREAD. It is from these three registers that the data to the affinity calculator 312 is provided together with the loop count. The affinity calculation takes place in hardware (the ZOL device) and then results in a yes/no, a zero/one, a true/false, or a binary op count 508 as the operative result.

Figure 8:
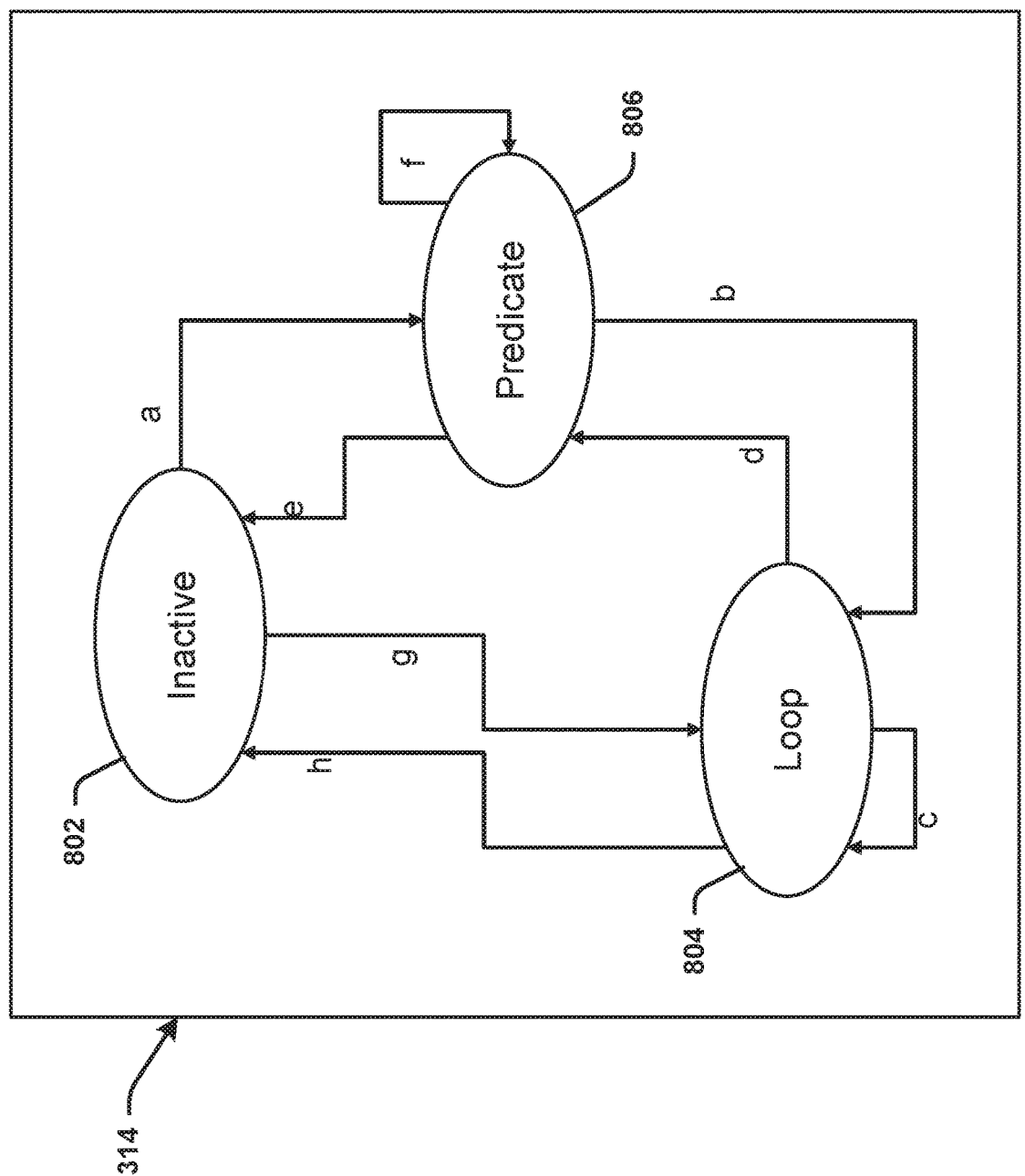
FIG. 8 is a block diagram illustrating a Finite State Machine of the ZOL device according to various aspects described.

Referring to FIG. 8, illustrated is an example of the finite state machine 314 of the ZOL device 304. The finite state machine 314 comprises at least three states of operation: an inactive state with no executions, a loop state when the loop body of a loop iteration is being executed and a predicate state that executes affinity audits on a latest loop iteration.

The decision, yes or no, from the affinity calculator 312 is evaluated by the finite state machine hardware 304 of the ZOL device 304. If the outcome is yes, which means the particular data element is indeed meant to belong to the thread with affinity, then this particular iteration of the loop is executed with the loop body only. If the answer is no, which means this data element does not belong to the thread, then operation remains in the predicate state 806, and a reset is performed of the program counter 320 to fetch the first instruction of the loop again in order for the loop to restart with a new iteration with the loop count.

In the case of a negative decision by the affinity calculator 304, the ZOL device 304 continues to stay in a same state, and the loop counter is reset for advancement to the next loop iteration. This increments/decrements the next program counter, but further goes to/points to the start of the loop again (loop start address), which means restarting the audit in hardware 304. If the outcome were positive, then execution of the loop body is performed in the loop state 304, and the loop body of the loop instruction is executed.

Path (a) corresponds specifically to the path from the inactive state 802 to the predicate state 806 when the loop instruction is encountered in SPMD mode of operation (where instruction 330, 402 triggers SPMD-mode). In contrast, path (g) corresponds specifically to the loop instruction encountered in a non-SPMD mode of operation. Paths (e) and (h) correspond to all loop iterations being completed. Path (f) is where an iteration does not have affinity to the THREAD and cycles. Path (b) is where the iteration does have affinity to the THREAD. Path (c) is where the iteration of the loop (loop instruction/loop body) is under execution in the loop state 804. Path (d) is where the iteration of the loop is completed in the SPMD mode of operation.

In SoC architectures where there will be many cores, running single program multiple data (SPMD) class of programs may be ran on certain CPUs. However, the SPMD programs have an inherent problem, the problem of audits. The audits themselves are not the problem, but in case they are performed many times simply because there are many data elements, they can contribute significantly to the computational cycles. Thus, eliminating specifically these SPMD loop overheads from threads and enhancing an existing piece of hardware (e.g., ZOL device 304) to perform the audit/overheads such inefficiencies can be mitigated.

In various embodiments, the data belonging to these two new instructions (330 or 402) are stored in newly carved out registers 404. When the loop instruction is executed, the FSM 314 is triggered to determine whether an iteration of the loop is applicable to the thread or not by having the affinity calculations performed on the hardware based on a decision of the affinity calculator 312, which can be binary. This decision is obtained by the FSM 314. If the decision is positive, then the FSM 314 allows progression to execution of the loop body, which means everything which is in the braces of the instructions 700 of FIG. 7 is executed. If this audit in hardware fails, then the predicate state is maintained in, and operational analysis is moved to the next iteration. These actions repeat until execution along all data elements of a data set in all corresponding threads with CPUs have finished traversing through all of the iterations.

Figure 9:
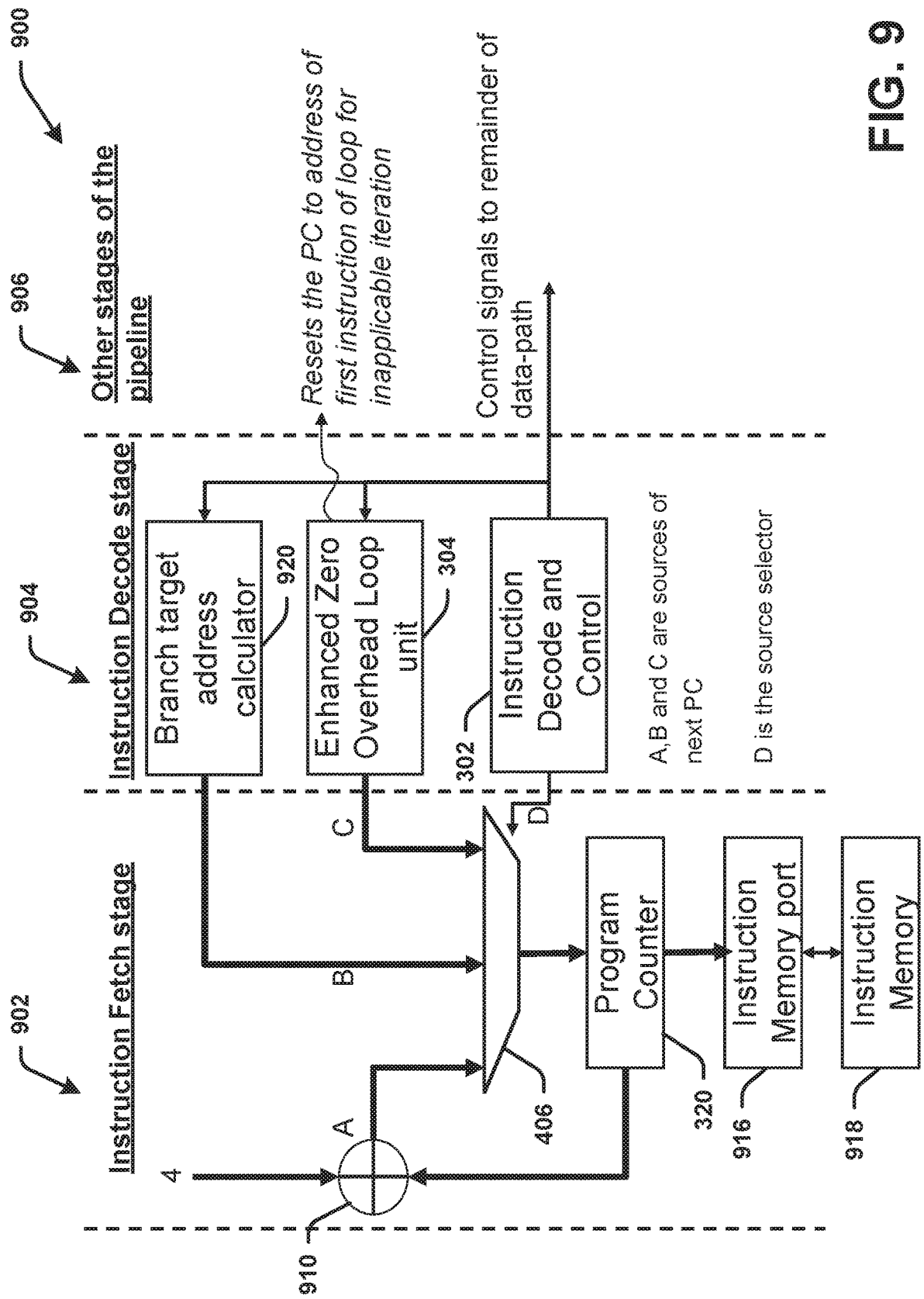
FIG. 9 is a block diagram illustrating predicated looping for controlling a program counter in loop mode according to various aspects described.

Referring to FIG. 9, illustrated is an example scheme of the ZOL device 304 for controlling the program counter in a loop mode of operation. Various stages of operation are illustrated, including an instruction fetch stage 902, an instruction decode stage 904, and other stages of the pipeline processing 906.

A next address, or an address of a next loop instruction can be the contents of the PC 320 (as the output going to the summer 910) as a particular a value. This address from the PC 320 can be added with another value such as a constant (e.g., four, or the like), which results in the value annotated as "A", for example, being generated and provided to the multiplexer 406. The output "A" can then be programmed back into the PC 320. Because the PC 320 contains addresses, this updated address is then provided to the memory port 916. The memory port 916 can interface with the instruction memory 918, which contains the instructions (e.g., the loop instruction(s)). Then the instruction memory port 916 by command derives an address, obtains the instruction word(s) and provides them to the instruction decode stage 904. This is one way of obtaining the instruction (e.g., the loop instruction) from memory 918.

In other instances, control instructions, such as a branch instruction or a sub-routine call instruction, for example, from the branch target address calculator 920 can operate to reset the PC 320 to the address of the first loop instruction of the business logic or task. Rather than adding a value of four to an existing address of the PC 320, the address of the program can be derived from a control instruction, a branch instruction, or a sub-routine call instruction, and have the resulting address programmed into the PC 320 as the source "B", for example.

A third source of the loop instruction address can be from the enhanced ZOL 304 that is configured to also reset the PC 320 to the address of the first instruction of the business logic or task as annotated as "C". Therefore, rather than having only two sources, a third source is also envisioned with the ZOL device 304 for resetting the PC 320 to the address of the first instruction of the business logic or task. Then the selection of which of these sources is to be implemented can be performed by a special signal to the multiplexer 406 via the instruction and decode control 302, annotated as "D" that signals the multiplexer 406 which of "A", "B" or "C" (annotated as such for FIG. 9) should go into the PC 320 and subsequently into the instruction memory port 916, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 10:
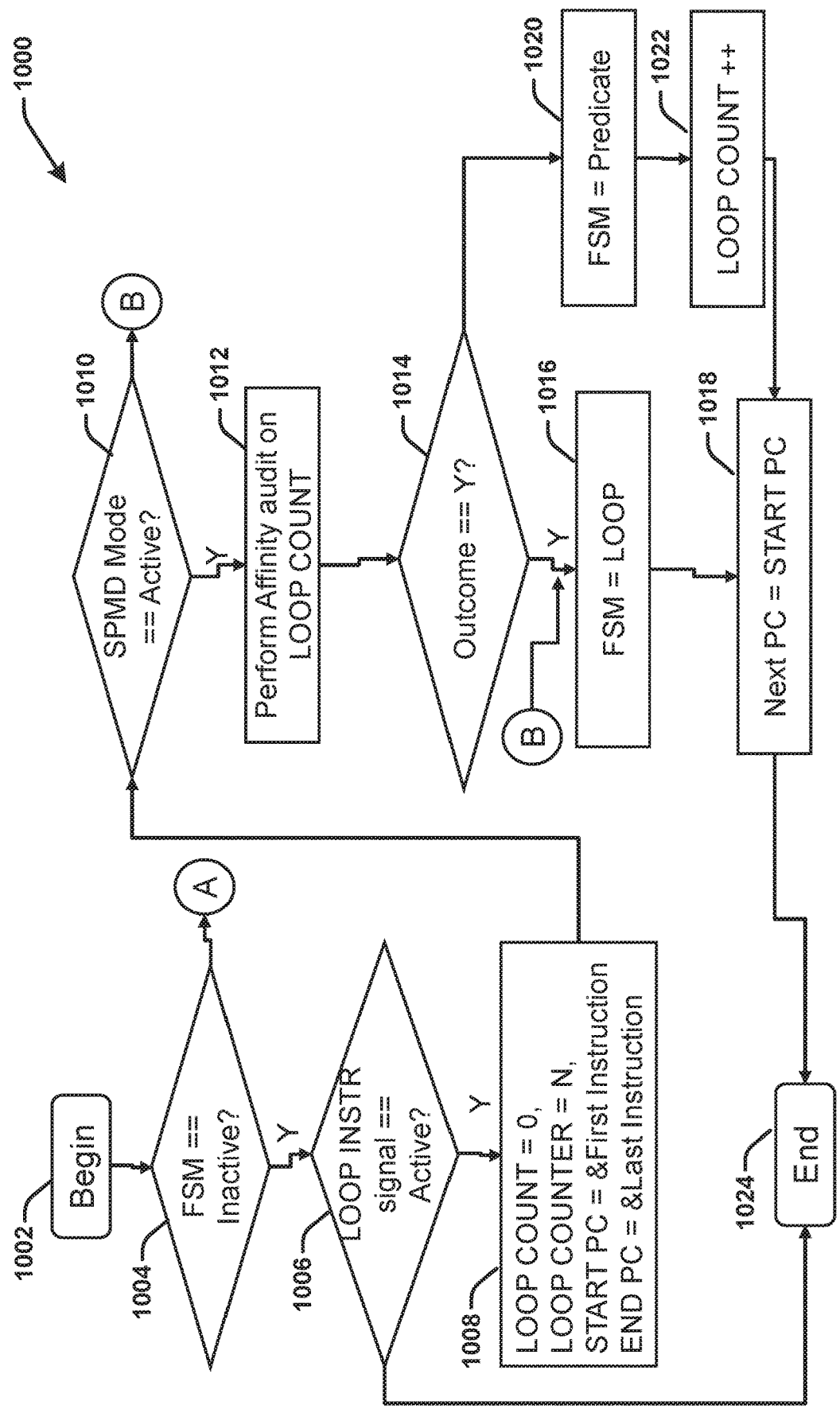
FIG. 10 is an example process flow of the Finite State Machine of the ZOL device according to various aspects described.
Figure 11:
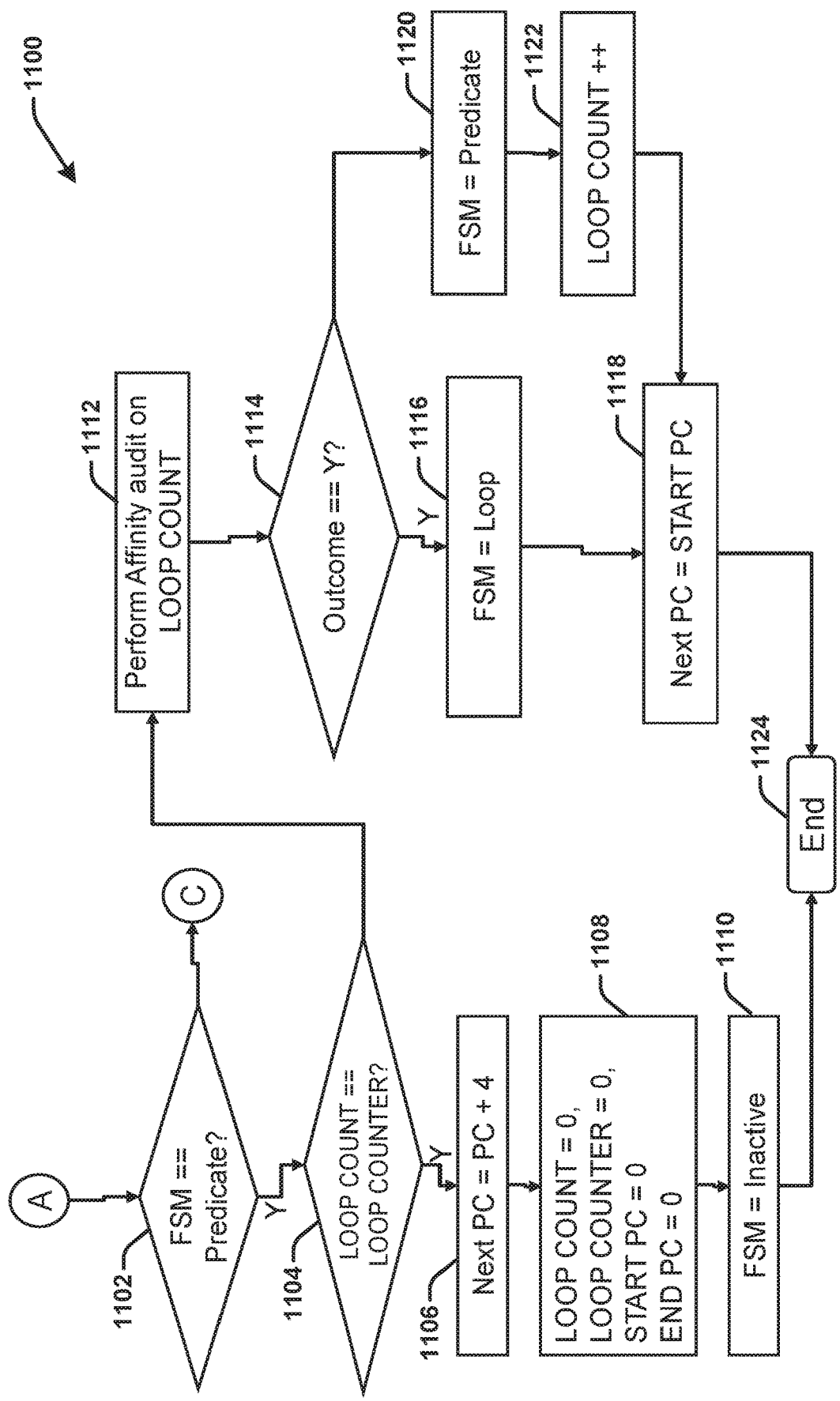
FIG. 11 is another example process flow of the Finite State Machine of the ZOL device according to various aspects described.
Figure 12:
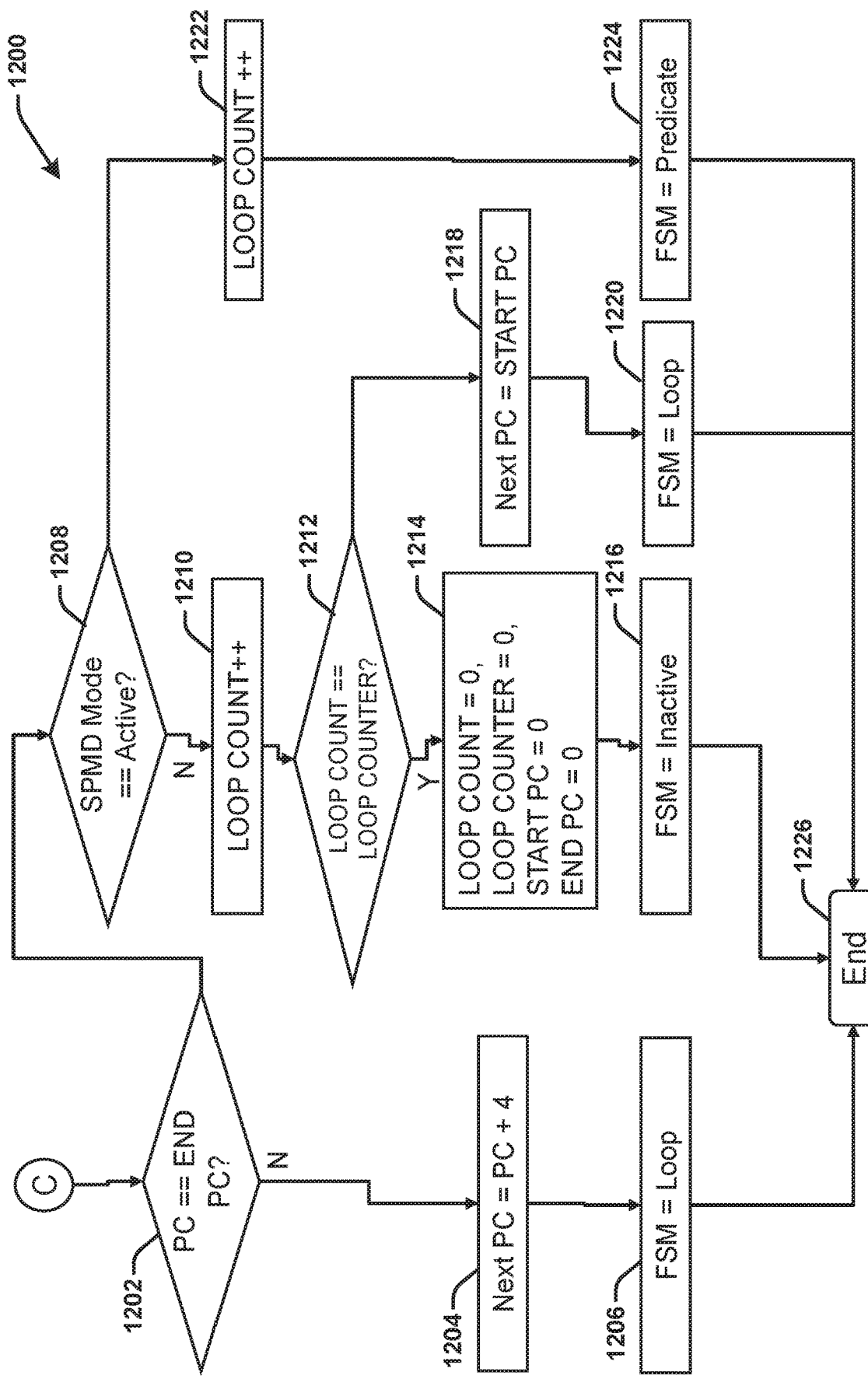
FIG. 12 is another example process flow of the Finite State Machine of the ZOL device according to various aspects described.

Referring to FIGS. 10-12, illustrated is a process flow of the FSM 314. The process flow 1000 of FIG. 10 illustrates kickstarting or initial process of the looping execution process in the ZOL device 304. The process flow 1100 of FIG. 11 illustrates processes in the predicate state 806 of FIG. 8. The process flow 1200 of FIG. 12 illustrates processes in the loop state 804 of FIG. 8. The FIGS. 10-12 basically detail the progression and transition among the three states of the FSMs: what causes a state to be repeated, what causes a state to be transitioned from predicate to loop, and then back from loop to predicate, and then the loop state returns to inactive 802 to continue future operation accordingly.

As illustrated in FIG. 10, the process flow 1000 initiates with 1002, then proceeds to determine whether the FSM is inactive. If no, the method continues to process flow "A" detailed further at FIG. 11. If yes, the method proceeds to 1006 where a loop instruction signal (e.g., loop) is examined. If active, then the process flows to 1008, otherwise ends at 1024. At 1008, the operands from the loop instruction signal are utilized such that loop count is equal to zero, the loop counter is set for the loop iteration number N, START PC is set to the program counter at the first instruction address of the loop body instruction to be executed with the data element(s), and the end PC sets the last instruction.

The process flow proceeds to 1010 to determine whether the SPMD mode is active. If not active, the method proceeds to "B". If SPMD mode is active, the process flow 1000 continues to perform the affinity audit on the value contained in the loop count register (representing a particular data element of a data set, for example) at 1012. At 1014, if the outcome is positive and the data element belongs to the particular thread under consideration, the process flow then proceeds to the FSM loop state 804 at 1016 to execute the loop body of the loop instruction only, programs the next program counter with the start address of the loop body at 1018, and ends at 1024. At 1014, in the case of a negative decision by the affinity calculator 304, the process flow of the ZOL device 304 continues to or remains at 1020 to the FSM predicate state 806, and the loop counter is incremented at 1022 and the next program counter is set to the start program counter address at 1018.

FIG. 11 illustrates further details of process flow 1100 continuing at "A" for processes in the predicate state 806 of the FSM 314. If the process flow 1000 of FIG. 10 is not in the inactive state 802, the process flow continues to 1102 where a determination is made if the state is in the predicate state 806. If not, FIG. 12 continues at "C", and if yes, then a determination is made at 1104 as to whether the loop count equals the loop counter. If the loop count matches the loop counter, it means that all iterations of the loop have been completed. Then the process flow continues to 1106 where the next program counter is incremented. Then at 1108 the LOOP COUNT, LOOP COUNTER, START PC, and END PC are reset, and at 1110 the FSM moves to the inactive state 802.

If the loop count does not equal the loop counter, it means that not all iterations of the loop have been completed and the process flows to 1112 where an affinity audit is performed on the loop count. An affinity determination is made on the data element or iteration at 1114. If not, the FSM remains in the predicate state 806 at 1120, and the loop count is incremented at 1122 and the next program counter is set to the start PC address to be reset for a next loop body to be processed at 1118. If the loop count does have affinity, then the process flow continues to 1116 to the loop state 804 and then resets the program counter at 1118. The process flow ends at 1124.

FIG. 12 illustrates further details of process flow 1100 continuing at "C" for processes in the loop state 804 of the FSM 314. At 1202 a determination is made if the program counter is at an end PC address. If no, then a Next PC is increment at 1204 indicating that the next sequential instruction of the loop body is to be executed and the FSM state stays in the loop state 804 at 1206. If yes, then all instructions of the loop body pertaining to the latest iteration have been executed, and the process flow must now determine if the SPMD mode is active at 1208. If the SPMD mode is not active, a loop count is incremented at 1210 and a determination is made if the loop count is the loop counter at 1212.

If yes, it means that all iterations of the loop have been completed and hence then the LOOP COUNT, LOOP COUNTER, START PC, and END PC are reset at 1214 and the FSM state is in the inactive state 802 at 1216. If no, it means that not all iterations of the loop have been completed and hence, the next program counter is set to the start program counter at 1218 and the loop state 804 is entered at 1220. If the SPMD mode is active at 1208, the loop count is incremented at 1222, and the FSM state is set to the predicate state 806 at 1224. The process flow ends at 1226.

As such, the process flows 1000 through 1200 demonstrate processes for the ZOL device 304 to perform affinity related audits in hardware and rapidly skip iterations of loop computing (predicate loop execution) by enhancing the ZOL device functionally to improve the speedup of SPMD applications/programs.

Figure 13:
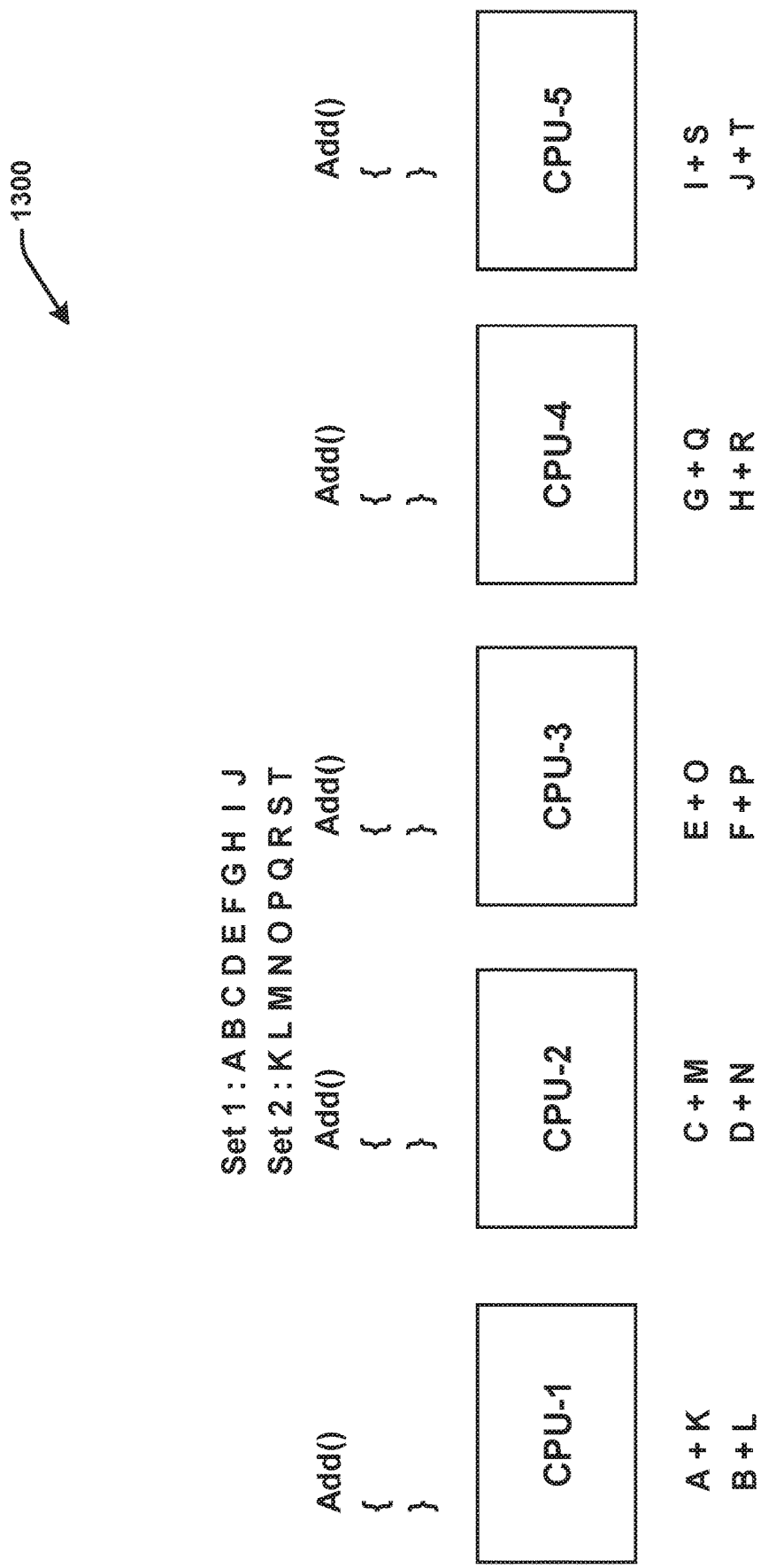
FIG. 13 is an example SPMD parallel process with the ZOL device according to various aspects described.

Referring to FIG. 13, illustrated is an example SPMD parallel processing 1300 of loop instructions for data sets with one or more ZOL devices 304 according to aspects disclosed in the above figures FIG. 1-12 and herein. CPU-1 through CPU-5 could be a part of the compute farm 114, for example, or other multi-processor system where a main program or thread has been forked for loop operations on data based on a threshold, or parameter (e.g., a processing capacity, a data amount, or other criteria). The data could be partitioned according to at least one of: block partitioning, cyclic partition, or other partitioning so that the compute farm 114 comprising CPU-1, CPU-2, CPU-3, CPU-4, and CPU-5 can operate thereon. The CPUs, for example, could be a part of a same SoC as a cluster of processing units therein or a separate external cluster.

The task to be executed on the data sets is the same for each CPU-1 through CPU-5. For example, the task can comprise an ADD function for illustration, but one or more tasks with one or more functions or operations can be envisioned herein to be executed with corresponding data elements that are associated with a CPU-1 through CPU-5, respectively. A first data set comprises Set 1: A B C D E F G H I J, and second data set comprises Set 2: K L M N O P Q R S T, in which each data element of the data set represented by a letter could be any alpha-numeric, type of data for operation. Each data element can correspond to a respective software thread with a CPU according to the partitioning of one or more data sets and be executed via an associated thread for executing the task with the data elements corresponding to it from the data sets.

The processing units (CPU-1 through CPU-5) of the multi-processor system 1300 can execute a same program, but operate on different data element. Although five CPUs are illustrated, for example, the embodiments in this disclosure are not limited to any one number or amount of processing units. The objective for this example SPMD parallel processing can be to add numbers from the first set with numbers from the second set to produce ten results via an addition program. The add program executes on each of the five CPUs as a single program. The program can run on each CPU, adding two pairs of numbers from each set producing two results each. The two pairs of numbers a particular CPU handles can be different from the pairs that other CPUs handle according to the data element partitioning mechanism. Thus, the same program running on the five CPUs can operate on five different pairs of the data as Multiple Data, in effect processing an SPMD application for a main program via SPMD parallel processing, for example. Because each CPU produces two results, five CPUs can produce 10 results concurrently or at about the same time.

Each of the CPUs via a ZOL component/device 304 can audit A and K for example of the data sets. As an example, CPU 1 having affinity to A and K will execute A+K while CPU-2 through CPU-5 will fail or deem a negative affinity for their respective audits. While CPU-1 executes the loop body of the loop instruction for processing the data elements A and K with the task, the other CPUs will continue auditing the next iteration to determine if B and L belong to each of them with an affinity as an auditing of the second item or data element of each data set. CPU-1 will go on to add A and K, whereas at CPUs 2, 3, 4 and 5, the hardware will reset the program counter 320 to be at the start of the business logic (task), and then go on to examine B and L.

Then, for example, only CPU-3 might past the audit for B and L data elements of the corresponding data sets, for example, whereas the others would fail. The CPUs that have failed will simply march on to the next data element of the data set(s). However, in this particular example B and L also belong to CPU-1. As such a loop of all ten data elements is executed with an audit for each data element being performed in a ZOL device based on the instructions 330, 402 (spmd-enter, corresponding operands, and spmd-exit), the result of the affinity calculator 312 and the FSM 314, for example.

C and M belong to CPU-2, so therefore the audit will pass along on CPU-2. CPUs, 3, 4, 5 will have their audits (SPMD loop overheads) failed and the others, including CPU-1 eventually once executing A+K and B+L, will march on to D and N. Upon recognizing that C and M do not belong to it, for example, a CPU will reset its program counter 320 to the beginning of the add operation loop instruction, the adding of the business logic or task, and then examine D and N for affinity with the ZOL device 304.

Referring to FIGS. 14-15, illustrated are operational description of example Assembly instructions (not shown) 1400 and 1500, respectively. FIG. 15 demonstrates a modified operational description of Assembly Code based on the functions and operations of the ZOL device 304 described herein that is configured to eliminate the costly software audits or SPMD overhead instructions of loop instructions and remove it to hardware. As such, the function of the hardware 304 is to perform the audit on each pair of data sets with the data elements. If an audit fails, the hardware ensures that the program counter 320, for example resets to the address 1016 in FIG. 15, which is the address of the first instruction of the business logic (e.g., the Add function or task). If the audit passes, the hardware 304 first resets the program counter to 1016 of FIG. 15 and allows it to increment, thus ensuring the addition operation.

Two additional instructions, spmd_enter and spmd_exit, are received by the hardware 304 after being decoded that indicate whether SPMD mode is entered into or exited out of at opportune times, or at forking operations, for example. As described above, operands are obtained from the spmd_enter instruction as a trigger signal to enter into SPMD mode. The operands include the THREAD-ID of the thread executing a particular CPU (e.g., CPU-1 of FIG. 13), which can be a number 0 through 4 in relation to the example of FIG. 13. The number of THREADS operand would be five is another operand of the instruction spmd-enter. An additional operand of this instruction is the size of the data or Block Size, which is two pairs in the example of FIG. 13.

Each of the operands are stored via the ZOL device 304 in corresponding or specifically associated registers 404: BLOCK-SIZE, MYTHREAD, THREADS, in response to the spmd-enter instruction being obtained. The data of these registers 404 are utilized at the execution of the loop body, represented by 1016 through 1028 in the Assembly Code example of FIG. 15.

The audit (as performed in the affinity calculator 312 with the FSM 314) can be conducted specifically on the index of the loop, or the loop index. For the example of FIG. 13, there are ten data elements and thus the loop index can range from zero to nine of a data set, and thus correspond to a number of data elements of a data set. The ZOL device 304 maintains the loop count, which can mirror the loop index. The loop count can be maintained in the loop count register of registers 404 and the information for this register can be fed to the affinity calculator 312, for example. A general purpose or shadow register 322, for example, can mirror data from the loop count register. A compiler of the software can already have generated an instruction at the start of the Add program to push the contents of this general purpose register contents to stack such that the register 322 mirrors the loop count. In this manner, the loop index can be derived by reading the general purpose register 322, for example.

The ZOL device 304 described herein is configured to also execute legacy operations by entering and exiting from SPMD mode and entering and exiting from an additional predicate state in the FSM 314, for example. The predicate state can be entered into when a program expresses its intent to enter spmd mode by means of the instruction 330, 402. It is this predicate state whereby the audit is carried out in hardware instead of a part of software and the program counter 320 along with the general purpose register 322 is managed; otherwise, two states are only utilized as in legacy: inactive and loop. Once the spmd-exit instruction is executed the registers 404 are all cleared or wiped clean and the spmd mode is withdraw for non-spmd mode. If now or afterwards, a loop instruction is encountered, no auditing is necessarily performed in it. The program counter increments and gets to the last instruction of the loop before going back to the first instruction of the loop.

Figure 16:
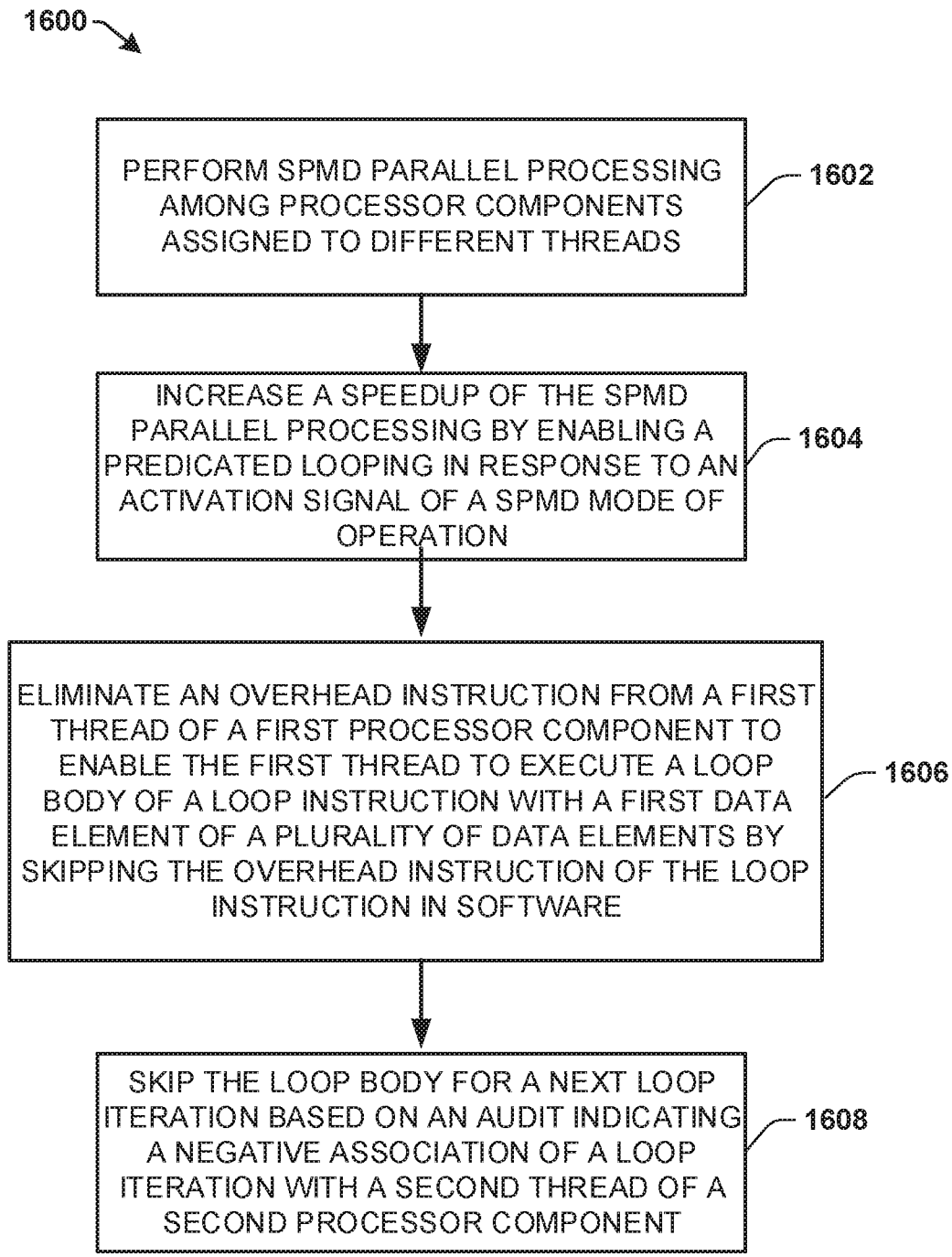
FIG. 16 is a flow diagram illustrating another process flow according to various aspects described.

Referring to FIG. 16, illustrated is an example process flow 1600 for single program multiple data (SPMD) parallel processing in a Zero Overhead Loop (ZOL) device. The process flow 1600 initiates at 1602 for performing, via one or more processors, SPMD parallel processing among a plurality of processor components that are assigned to different threads.

At 1604, the process flow 1600 further comprises increasing a speedup of the SPMD parallel processing by enabling a predicated looping in response to an activation signal of a SPMD mode of operation.

At 1606, the process flow 1600 further comprises eliminating an overhead instruction to be processed from a first thread of a first processor component to enable the first thread to execute a loop body of a loop instruction with a first data element of a plurality of data elements by skipping the overhead instruction of the loop instruction in software.

At 1608, the process flow 1600 further comprises skipping the loop body for a next loop iteration based on an audit indicating a negative association of a loop iteration with a second thread of a second processor component.

The process flow 1600 can further include performing the audit in response to receiving the SPMD mode signal, and further determining whether the loop iteration applies to the first thread and the another thread. An address to a first instruction of a loop can be set to without a loop count being modified in response to an affirmative determination of the audit that the loop iteration applies to the first thread to proceed with execution of the loop body, respectively. A loop count can be incremented/decremented in response to a negative determination of the audit to the second thread and resetting the loop count for the next loop iteration.

The audit can be performed via the affinity calculator 312 with a second data element of the plurality of data elements and the second thread of the second processor component, while concurrently executing the loop body of the loop instruction in the first thread of the first processor component with the first data element of the plurality of data elements via threads of processing unit(s).

Figure 17:
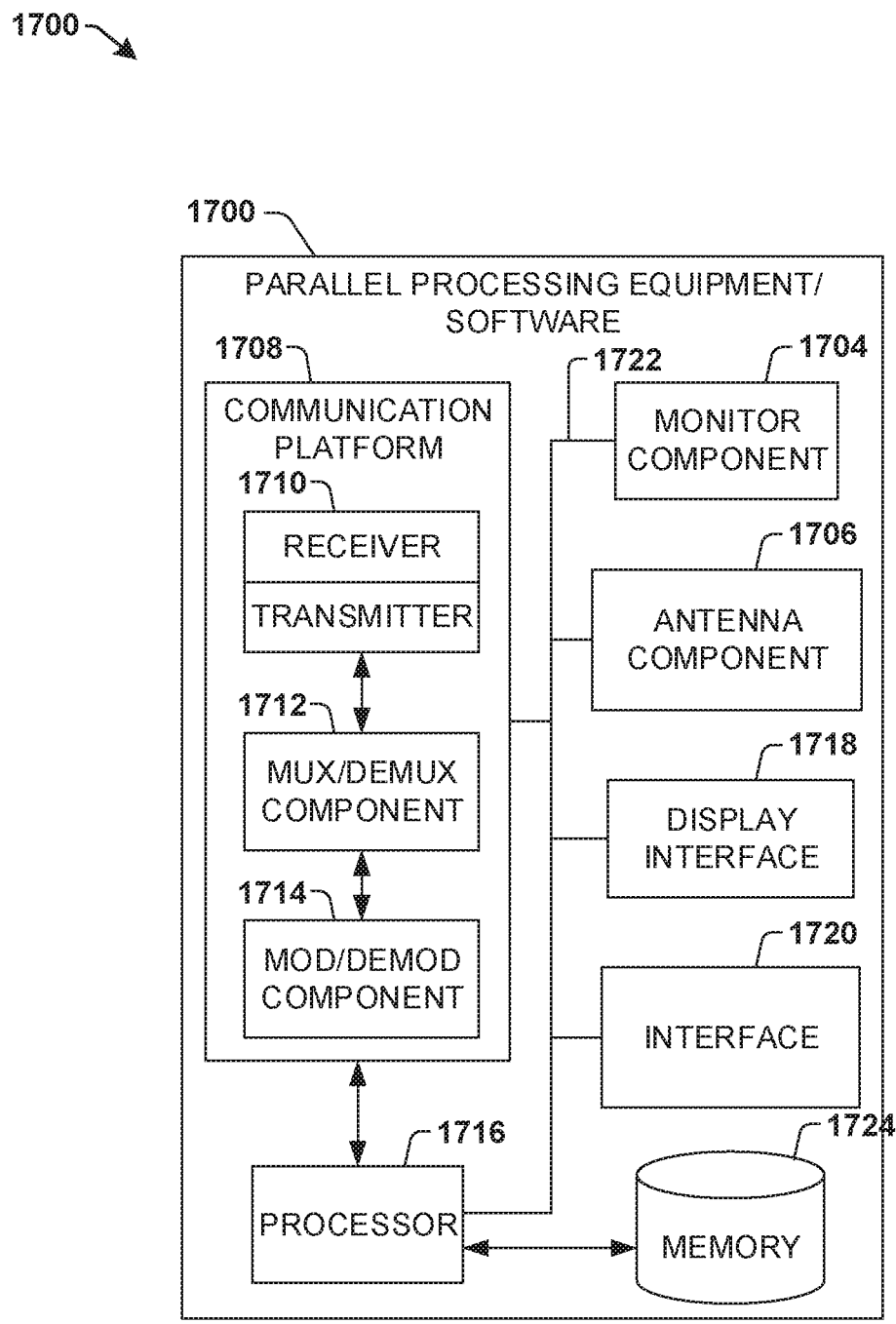
FIG. 17 is an example parallel processing equipment/software for implementation in accord with various aspects described.

To provide further context for various aspects of the disclosed subject matter, FIG. 17 illustrates a block diagram of an embodiment of parallel processing equipment and software that can enable or exploit features or aspects disclosed herein such as integrated with a compute farm, an SoC or other circuitry.

In an aspect, communication platform 1708 includes a receiver/transmitter 1710 that can convert analog signals to digital signals upon reception of the analog signals, and can convert digital signals to analog signals upon transmission. In addition, receiver/transmitter 1710 can divide a single data stream into multiple, parallel data streams, or perform the reciprocal operation. Coupled to receiver/transmitter 1710 can be a multiplexer/demultiplexer 1712 that can facilitate manipulation of signals in time and frequency space. Multiplexer/demultiplexer 1712 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1712 can scramble and spread information (e.g., codes, according to substantially any code known in the art, such as Hadamard-Walsh codes, Baker codes, Kasami codes, polyphase codes, and so forth).

A modulator/demodulator 1714 is also a part of communication platform 1708, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1716 configured to confer, at least in part, functionality to substantially any electronic component in processing equipment and/or software. In particular, processor 1716 can facilitate configuration of access equipment and/or software through, for example, monitor component 1704, antenna component 1706, and one or more components therein. Additionally, access equipment and/or software can include display interface 1718, which can display functions that control functionality of access equipment and/or software or reveal operation conditions thereof. In addition, display interface 1718 can include a screen to convey information to an end user. In an aspect, display interface 1718 can be a liquid crystal display, a plasma panel, a monolithic thin-film based electrochromic display, and so on. Moreover, display interface 1718 can include a component (e.g., speaker) that facilitates communication of aural indicia, which can also be employed in connection with messages that convey operational instructions to an end user. Display interface 1718 can also facilitate data entry (e.g., through a linked keypad or through touch gestures), which can cause access equipment and/or software to receive external commands (e.g., restart operation).

Interface 1720 facilitates connection of the equipment (components) and/or software that can include one or more components described in this dis disclosure such as through backhaul link(s) (not shown), which enable incoming and outgoing data flow. The interface 1720 can be internal or external to access equipment and/or software and can utilize display interface 1718 for end-user interaction and status information delivery.

Processor(s) 1716 can be functionally connected to communication platform 1708 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor(s) 1716 can be functionally connected, through data, system, or an address bus 1722, to display interface 1718 and broadband network interface 1720, to confer, at least in part, functionality to each of such components.

In access equipment and/or software memory 1724 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1724 also can store data structures, code instructions and program modules, system or device information, code sequences for scrambling, spreading and pilot transmission, access point configuration, and so on. Processor(s) 1716 can be coupled (e.g., through a memory bus), to memory 1724 in order to store and retrieve information used to operate and/or confer functionality to the components, platform, and interface that reside within access equipment and/or software.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus employed in a parallel processing device comprising:
one or more processing devices, coupled to a memory that includes instructions to execute operations, configured to:

perform single program multiple data (SPMD) parallel processing among the one or more processing devices that are assigned to a plurality of threads for performing a SPMD task; and generate, via a Zero Overhead Loop (ZOL) device of the one or more processing devices, a predicated looping of the SPMD task by generating a check that determines whether a data element of a data set is associated with a thread of the plurality of threads to enable an execution of an instruction of a loop by the thread, wherein the check comprises an affinity determination of whether the thread and the data element are associated with a loop iteration based on one or more predetermined criteria; and a finite state machine comprising a predicate state that enables skipping of the loop iteration in response to a negative determination of an association with the thread to the data element from the check, and a loop state that in response to an SPMD mode signal triggers the execution of a loop body of the loop.

2. The apparatus of claim 1, wherein the one or more processing devices are further configured to remove execution of one or more overhead instructions from software and perform the one or more overhead instructions in a hardware component of the ZOL device that is in response to a forking operation of the thread as at least a part of the predicated looping based on the affinity determination.

3. The apparatus of claim 1, wherein the one or more predetermined criteria comprise at least one of: a mode of operation or a set of instruction operands from a decode/control component coupled to the ZOL device, wherein the mode of operation is based on an SPMD mode and a non-SPMD mode, wherein the SPMD mode enables the check to be performed in hardware.

4. The apparatus of claim 1, wherein the one or more processing devices are further configured to skip the loop body of the loop with the data element and reset a loop counter for another loop iteration, in response to the affinity determination comprising a negative indication.

5. The apparatus of claim 1, wherein the one or more processing devices are further configured to:
increase a speedup of the SPMD parallel processing in response to an activation of a SPMD mode of operation by removing the check from the SPMD task of the plurality of threads, and enabling the thread to perform only the execution of the loop body of the loop for the data element, wherein the loop comprises the loop body to execute the SPMD task.

6. The apparatus of claim 1, further comprising:
an affinity calculator of the ZOL device configured to perform the check of the thread with the loop iteration based on the one or more predetermined criteria, wherein the one or more predetermined criteria comprises a set of operands and a loop count of a loop counter, wherein the set of operands comprises at least one of: a thread identifier, a block size, or an indication of other threads associated with the data element of a data set.

7. The apparatus of claim 6, wherein the affinity calculator comprises one or more dividers and a comparator coupled to the one or more dividers, further configured to determine an output of the check based on the association of the thread to the data element, wherein the output indicates whether the loop body of the loop is to be processed or skipped for a next loop iteration based on the affinity determination.

8. The apparatus of claim 1, further comprising:
a plurality of registers comprising different instruction operands, to enable the check;
a shadow register comprising a latest loop iteration count to enable an affinity determination between the data element of the data set and the thread at the one or more processing devices; and
wherein in response to a SPMD trigger, the one or more processing devices are further configured to enter into an SPMD mode of operation based on the different instruction operands stored in the plurality of registers, and utilize the latest loop iteration count to execute the loop.

9. A system for parallel processing comprising:
a first processor configured to process application data for parallel processing; and
a Zero Overhead Loop (ZOL) device, coupled to the first processor, configured to optimize execution of an instruction of a loop by a business logic of a thread associated with a data element of a data set by removing execution of overhead instructions from the thread based on a check to the thread, wherein the check determines whether the data element comprises an affinity to the thread,
wherein the ZOL device comprises:
a plurality of registers configured to store operands derived from a plurality of instructions for the check;
an affinity calculator configured to perform the check to determine an association of the data element to the thread based on the plurality of instructions and a loop count of a loop counter; and
a finite state machine configured to receive an output of the affinity calculator and determine a processing state based on the output of the affinity calculator for a single program multiple data (SPMD) mode and a non-SPMD mode, wherein the SPMD mode comprises one or more additional states than the non-SPMD mode.

10. The system of claim 9, wherein, in response to an affirmative determination of the check a second processor is configured to process a loop body of the loop by the thread in the SPMD mode, and in response to a negative determination of the affinity, skipping the loop and resetting a loop counter for another loop iteration.

11. The system of claim 9, wherein, in response to being in the SPMD mode, one or more additional states of the finite state machine enables skipping of an iteration of the loop in response to a negative determination of the affinity with the data element to the thread, and execution of the loop without an overhead instruction in response to a positive determination of the affinity with the data element to the thread, and, wherein the non-SPMD mode results in the loop with an overhead, and the SPMD mode enables the check to be performed in hardware.

12. The system of claim 9, wherein the affinity calculator comprises one or more dividers and a comparator to determine whether the data element comprises the affinity with the thread for processing of a loop body, or to skip the loop body for a next loop iteration associated with another data element of the data set, or another thread of another processing component.

13. The system of claim 9, wherein the ZOL device comprises:
a first register that stores an operand identifying the thread;
a second register that stores a block size of the data element; and a third register that stores an indication of other threads associated with the data element, wherein the ZOL device is configured to receive the operand identifying the thread, the block size and the indication of the other threads, in response to an SPMD signal that triggers the SPMD mode in the finite state machine and determine the affinity based on the operand identifying the thread, the block size and the indication of the thread.

14. The system of claim 9, wherein the ZOL device is further configured to skip an execution of a loop body of the loop and reset a counter for another loop iteration, in response to the check indicating a negative determination of the association of the data element with the thread, wherein the counter is configured to indicate an instruction address.

15. A method for single program multiple data (SPMD) parallel processing with a Zero Overhead Loop (ZOL) device comprising:

performing the SPMD parallel processing among one or more processing units that are assigned to different threads;

increasing a speedup of the SPMD parallel processing in an SPMD mode of operation that enables a predicated looping in response to an activation signal;

eliminating execution of an overhead instruction in software to be processed from a first thread of a first processor component to enable the first thread to execute a loop body of a loop with a first data element of a data set;

skipping the loop body for a next loop iteration based on a check indicating a negative association of a loop iteration with a second thread of a second processor component;

performing the check in response to receiving the activation signal;

determining whether the loop iteration applies to the first thread and the second thread;

setting an address to a first instruction of a loop without a loop count being modified in response to an affirmative determination of the check that the loop iteration applies to the first thread to proceed with execution of the loop body, respectively; and incrementing or decrementing the loop count in response to a negative determination of the check to the second thread and resetting the loop count for the next loop iteration, wherein the incrementing or decrementing further comprises incrementing or decrementing the loop count in a shadow register to mirror the loop count of a loop register in the ZOL device and enable the first thread to execute the loop body of the loop.

16. The method of claim 15, further comprising:

performing the check with a second data element of the data set and the second thread of the second processor component, while concurrently executing the loop body of the loop in the first thread of the first processor component with the first data element of the data set.

* * * * *